(12) United States Patent
Yousefi et al.

(10) Patent No.: US 11,804,914 B1
(45) Date of Patent: Oct. 31, 2023

(54) CALIBRATION OF A PHASED ARRAY ANTENNA BY USING A PROBE ANTENNA

(71) Applicant: Amazon Technologies, Inc., Seattle, WA (US)

(72) Inventors: Tara Yousefi, Bellevue, WA (US); Alireza Mahanfar, Kirkland, WA (US); Christopher Steven Merola, Kirkland, WA (US)

(73) Assignee: Amazon Technologies, Inc., Seattle, WA (US)

(*) Notice: Subject to any disclaimer, the term of this patent is extended or adjusted under 35 U.S.C. 154(b) by 401 days.

(21) Appl. No.: 16/868,882

(22) Filed: May 7, 2020

(51) Int. Cl.
*H04B 17/12* (2015.01)
*H04B 17/21* (2015.01)
*H01Q 3/26* (2006.01)
*H04B 7/185* (2006.01)

(52) U.S. Cl.
CPC ............ *H04B 17/12* (2015.01); *H01Q 3/26* (2013.01); *H04B 17/21* (2015.01); *H04B 7/1851* (2013.01)

(58) Field of Classification Search
CPC ...... H04B 17/12; H04B 17/21; H04B 7/1851; H01Q 3/26
See application file for complete search history.

(56) References Cited

U.S. PATENT DOCUMENTS

| | | | | | |
|---|---|---|---|---|---|
| 5,235,342 | A | * | 8/1993 | Orton | H01Q 21/22 343/703 |
| 6,157,343 | A | * | 12/2000 | Andersson | H01Q 3/267 342/174 |
| 9,786,981 | B2 | * | 10/2017 | Mahanfar | H01Q 9/42 |
| 2009/0075615 | A1 | * | 3/2009 | Roberts | H01Q 3/267 455/272 |
| 2010/0117890 | A1 | * | 5/2010 | Vook | H04B 17/21 342/174 |
| 2015/0138026 | A1 | * | 5/2015 | Shay | H04B 17/12 343/703 |

FOREIGN PATENT DOCUMENTS

| | | | | |
|---|---|---|---|---|
| EP | 3142188 B1 | * | 1/2020 | ............ H01Q 3/267 |
| JP | 3877141 B2 | * | 2/2007 | ............ H04B 17/12 |
| WO | WO-2017001013 A1 | * | 1/2017 | ............ H01Q 1/243 |
| WO | WO-2017211408 A1 | * | 12/2017 | ............ H04B 17/12 |

OTHER PUBLICATIONS

Kim Hassett, Phased Array Antenna Calibration Measurement Techniques and Methods, 2016, NSI-MI Technologies, Torrance California, USA, 4 pages.

Guolong He, et al., Fast Phased Array Calibration by Power-Only Measurements Twice for Each Antenna Element, Hindawi, International Journal of Antennas and Propagation, vol. 2019, Apr. 17, 2019, Article ID 6432149, 11 pages.

* cited by examiner

*Primary Examiner* — Jean B Corrielus
(74) *Attorney, Agent, or Firm* — Kilpatrick Townsend & Stockton LLP

(57) ABSTRACT

Techniques are described for detecting whether a phased array antenna is to be calibrated. In an example, a controller communicatively coupled with the phased array antenna measures a characteristic of a probe signal. The probe signal is communicated between an antenna element of the phased array antenna and a probe antenna mounted to the phased array antenna. The probe antenna is over-resonant. The controller further determines a drift of the phased array antenna based at least in part on the characteristic. Based at least in part on the drift, the controller initiates a calibration of the phased array antenna.

20 Claims, 15 Drawing Sheets

CALIBRATION OF A PHASED ARRAY ANTENNA BY USING A PROBE ANTENNA

BACKGROUND

Phased array antennas are used for a variety of communications and sensing applications due to their ability to transmit or sense a focused beam, and to do so directionally without the necessity of moving parts and without the phased array antenna changing physical orientation. Directionality of transmission or reception can be achieved by sequentially signaling individual antenna elements of the phased array antenna to transmit or to listen in a pattern. In the transmitting case, the phased transmission generates coherent waves of electromagnetic radiation in one direction. In the receiving case, the antenna elements can extract a signal from incident electromagnetic radiation received by the array when focused in the direction from which a transmission is received. One application of phased array antennas is for communication with satellites, which can be used as a platform for telecommunications, weather observation, imaging, geolocation, and other uses. However, existing phased array antenna systems are susceptible to signal drift. New approaches are therefore warranted to detect signal drift and recalibrate the phased array antennas, particularly for satellite communication.

BRIEF DESCRIPTION OF THE DRAWINGS

Various embodiments in accordance with the present disclosure will be described with reference to the drawings, in which.

DETAILED DESCRIPTION

Figure 1:
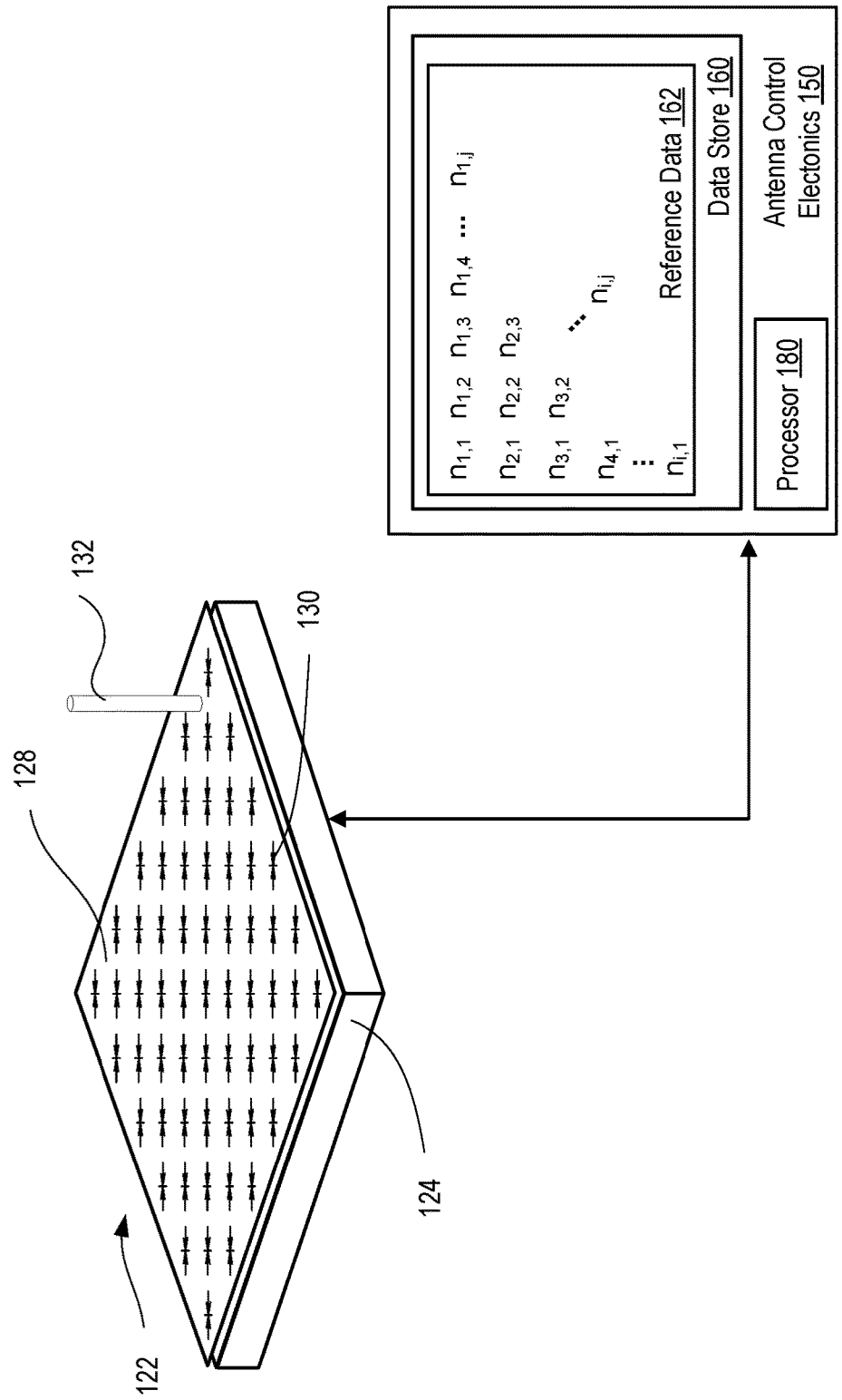
FIG. 1 illustrates an example of a phased array antenna calibration system, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a calibration system that includes phased array antennas, a one or more probe antennas mounted to the phased array antennas, and a controller. A phased array antenna includes multiple antenna elements, each within transmission range of at least one probe antenna. The probe antenna is mounted to the phased array antenna and is over-resonant in support of a small dynamic range. Over-resonance can be achieved by having an antenna length that is not a quarter of a wavelength or multiples thereof. In the calibration system, the probe antenna forms a part of a signal return path with antenna elements making up the phased array antenna. The probe antenna communicates (e.g., transmit and/or receive) a probe signal with each antenna element, depending on whether the phased array antenna is a transmitter array or a receiver array. The controller measures characteristics of the signal received by each antenna element in response to a transmission of a probe signal by the probe antenna or the signal received by the probe antenna in response to a transmission of a probe signal by each antenna element, and determines a drift by comparing the measurements to references characteristics (e.g., an element-wise signal measured during an initial calibration or during nominal operation). Based on the comparison, the calibration system determines whether to initiate a calibration of the phased array antenna.

In an illustration, consider a satellite example. In this illustrative example, a calibration system includes a phased array antenna, a probe antenna, and a controller as part of a satellite communications system. The calibration system schedules operation during a period of reduced bandwidth load associated with data transfer between the satellite communications system and other components of a communications network (e.g., other satellites, ground stations, user terminals, etc.). For example, the calibration cycle may be scheduled to coincide with a section of the satellite's orbit over an ocean or other uninhabited region of the surface of the Earth. During operation, the probe antenna transmits a probe signal. Each of the phased array antenna receives a signal in response to the transmission of this single probe signal and passes the received to the controller. The controller measures, for each antenna element, a phase and amplitude of the received signal and compares the phase and the amplitude to a reference phase and a reference amplitude defined for the antenna element. When any of the measured phase and the measured amplitude of the received signal are outside predefined ranges of operational phases and operational amplitudes, the controller initiates the calibration of the phased array antenna element.

The phased array antenna calibration system described herein provides improved robustness and performance of antenna systems. For example, in the case of satellite communications systems, prolonged operation, thermal cycling from exposure to solar radiation, and other phenomena affect the performance of the phased array antenna by detuning the phased array antenna elements. Detecting such detuning allows to re-calibrate the phased array antenna elements and the re-calibration compensates for the impact on operation of the communications system. Furthermore, one or more techniques for multiplexing the probe signal with other signals (e.g., datalinks carrying data transmitted to or received from another communication system, such as a ground station or a user terminal) allows the calibration system to interfere minimally with the operation of the satellite communications system, such that the detection operations have no impact or minimal impact to communications operations of the satellite communications system. In addition and as further described herein below, reversibly switching the probe antenna between an idle mode and an operative mode prevents the probe antenna from interfering with the operation of the satellite communications system when the phased array antenna calibration system is not in use.

In the interest of clarity, various calibration systems are described herein using a single-function probe antenna (e.g., a transmitting probe antenna or a receiving probe antenna), but embodiments of the present disclosure are not limited as such. According to embodiments of the present disclosure, communications systems include both phased array antenna transmitters and phased array antenna receivers, and the probe antenna serves as a transmitter and/or a receiver of probe signals. Further, various phased array antennas are described herein in connection with a satellite communications systems. However, the embodiments are not limited as such and apply to other types of communications systems, including ground communications systems employing phased array antennas such as the next generation of wireless communications technologies supporting cellular data networks referred to as 5G. Also in the interest of clarity, phase and amplitude of a received probe signal are described as characteristics measured by the controller, but embodiments are not limited as such. According to embodiments of the present disclosure, any characteristic of a signal usable for determining drift and thus determining whether calibration is to be initiated is applicable.

FIG. 1 illustrates an example of a calibration system 100, according to embodiments of the present disclosure. A phased array antenna system 122 includes a set of phased array antenna elements 130 and one or more probe antennas 132 that can be placed on the same substrate 128, in communication with signal processing hardware 124, as described in more detail in reference to FIGS. 4-5. The phased array antenna elements 130 for a phased array antenna and can be transmitter elements or receiver elements of the phased array antenna. The phased array antenna elements 130 and probe antenna 132 are suitable for transmitting or receiving in overlapping frequency bands, implementing a calibration system as described in more detail in reference to the figures, below.

In an example, the phased array antenna elements 130 are receiver elements. In this example, a probe antenna 132 transmits a probe signal to the phased array antenna elements. Each of these antenna elements 130 receives a signal in response to the transmission. In another example, the phased array antenna elements 130 are transmitter elements. In this example, each of the phased array antenna elements 130 transmits a probe signal and a probe antenna 132 receives a signal in response to each transmission. The transmissions of the different probe signals by the different phased array antenna elements 130 may not overlap in time.

In both examples, the signal processing hardware 124 needs to process a large range of signal strengths of the received signal in order to cover a large number of phased array antenna elements 130 in the phased array antenna. Typically, for an antenna element we can measure a signal strength. When measured in association with receiving a signal, this signal is commonly referred to as Received Signal Strength Indicator (RSSI). When acting as a receiver element, the signal strength is the strength of the signal received by the antenna element and corresponding to the probe signal transmitted from the probe antenna 132. When acting as a transmitter element, the signal strength is the strength of the signal received by the probe antenna 132 and corresponding to the probe signal transmitted from the antenna element. In both cases, the strength of the signal is a function of the amplitude and the phase of the signal. And the amplitude and the phase depend on the coupling of the antenna element with the probe antenna 132. In turn, the coupling depends on the distance between the antenna element and the radiation pattern of the probe antenna 132.

Typically the closest antenna element to the probe antenna 132 has the largest signal strength and the farthest antenna element from the probe antenna 132 has the smallest signal strength. The difference between the smallest signal strength and the largest signal strength is due to the difference between the largest coupling between the closest antenna element and the probe antenna 132 and the smallest coupling between the probe antenna element and the probe antenna 132. A dynamic range of the phased array antenna system 122 is the difference between the smallest signal strength and the largest signal strength (or, similarly, between the smallest coupling and the largest coupling).

If a probe antenna is resonant, the difference between the smallest signal strength and the largest signal strength can be significantly large, resulting in a significantly large dynamic range. In turn, this dynamic range would necessitate a significantly complex signal processing hardware to process signals that have very different strengths. Alternatively, a significantly number of probe antennas would be used, where each of the probe antennas would cover a different small subset of the antenna elements 130 of the phased array antenna.

In comparison, by using a probe antenna 132 that is over-resonant, the dynamic range can become significantly smaller, thereby reducing the complexity of the signal processing hardware 124 and/or the number of probe antennas needed to cover all of the antenna elements 130 of the phased array antenna. In particular, the radiation pattern of such an over-resonant antenna results in the closest antenna element and the farthest antenna element having similar coupling to the probe antenna 132 because of the shape and distribution of the radiation. In turn, the difference between the signal strengths of these two antenna elements (and, correspondingly, the phases and amplitudes) is within a small range (e.g., the amplitude of the signal associated with the farthest antenna element is within a threshold range of the amplitude of the signal associated with the closest antenna element, such as the ratio of the two amplitudes can be ten percent or less; similarly, the phase of the signal associated with the farthest antenna element is within a threshold range of the phase of the signal associated with the closest antenna element, such as the ratio of the two phases can be ten percent or less). Hence, by using an over-resonant probe antenna, the radiation pattern can result in a smaller needed dynamic range, thereby allowing measurements for the large number of phased array antenna elements 130, while reducing the number of needed probed antennas to cover the phased array antenna elements 130 and reducing the complexity of the signal processing hardware 124.

Accordingly, various embodiments of the present disclosure use an over-resonant antenna as a probe antenna 132. In particular, the probe antenna 132 has a length that is not a quarter of a wavelength "λ" or multiples thereof. Although sub-optimal in standard use case as far-field radiating element, the probe antenna 132 generates a radiation pattern that helps with reducing the dynamic range of the signals received and processed. This would result in broader coverage area of the probe antenna 132 within the phased array antenna for a given dynamic range.

In an example, the length of the probe antenna is between 0.25λ and 0.5λ, excluding 0.25λ and 0.5λ to avoid resonance. The closer the length is to 0.5λ, the smaller the difference is between the coupling strength of the nearest phased array antenna element to the probe antenna 132 and the coupling strength of the farthest phased array antenna element to the probe antenna 132. Therefore, the needed dynamic range is reduced at the expense of the return loss and impedance matching. In a specific example, the length of the probe antenna is a value between 0.25λ and 0.45λ, excluding 0.25λ to avoid resonance, or is a multiple of this value. In an illustrative use case, the length is 0.42λ or a multiple of 0.42λ.

In other words, the distance between each phased array antenna element and the probe antenna 132 affects the coupling between the phased array antenna element and the probe antenna 132 and, accordingly, the characteristic of the signal that either is received by the phased array antenna element in response to the transmission of a probe signal by the probe antenna 132 or that is received by the probe antenna 132 in response to the transmission of the phased array antenna element. The difference between the coupling of the nearest and farthest phased array antenna elements to the probe antenna 132 affects the dynamic range of the antenna system 122. By being over-resonant, the probe antenna 132 supports a relatively smaller dynamic range, whereby characteristics of the signals measured for the nearest and farthest phased array antenna elements and other phased array antenna elements in between are within the relatively smaller dynamic range.

As illustrated in FIG. 1, the phased array antenna system 122 includes an antenna substrate 128, which may be a substantially flat structural member or printed circuit board (PCB) to which antenna elements can be mounted. According to various embodiments of the present disclosure, the phased array antenna system 122 is a receiving antenna array configured to receive transmitted signals from a signal source (e.g. another satellite, ground station, aircraft, or other signal source). Additionally or alternatively, the phased array antenna system 122 can be a transmitting antenna array configured to transmit a signal in a steerable beam.

According to various embodiments, the phased array antenna system 122 can operate in a low frequency band (e.g. 15 to 20 GHz, or 17 to 20 GHz), which may be used for receiving signals. Alternatively, the phased array antenna system 122 can operate in a high frequency band (e.g. 27 to 30 GHz), which may be used for transmitting signals. The frequency bands noted herein are not exclusively assigned.

The probe antenna 132 can be mounted to and positioned relative to the phased array antenna system 122 in such a way to minimize interference with the operation of the phased array antenna system 122 (i.e. through shielding or interference with the elements). To that end, the probe antenna 132 may be mounted on or near the periphery of the phased array antenna system 122. Furthermore, the probe antenna 132 may be maintained in an idle mode between measurement and calibration cycles, for which the probe antenna 132 may be switched from the idle mode to an operative mode. In idle mode, the probe antenna 132 may be electrically be deactivated, such that the probe antenna 132 interferes only minimally with the operation of the phased array antenna system 122 during transmission and/or reception of signals (e.g., uplink signals, downlink signals, sidelink signals, etc.). To accommodate the peripheral position of the probe antenna 132, the probe antenna 132 may be over-resonant, such that the return path is described by a minimal dynamic range between the nearest and the farthest antenna element, relative to the probe antenna 132. In some embodiments, the probe antenna 132 is an omnidirectional monopole antenna, a patch antenna, or a helical antenna. A person having ordinary skill in the art would recognize alternatives or variants.

In an example, the calibration system 100 is installed in a satellite communications system. In this example, the phased array antenna system 122 operates as a transmitter antenna in an orbiting satellite oriented for transmission with a terrestrial communications network. The phased array antenna system 122 transmits signals to ground stations along its orbital path using a directional beam that is "steerable" by introducing a phase shift between antenna elements making up the phased array antenna. Over a period of continued operation, the phased array antenna system 122 may exhibit signal degradation, for example, caused by thermal deformation of the phased array antenna elements or thermal effects on the signal processing hardware making up the transmitter. In this example, the each of the phased array antenna elements 130 transmit a probe signal to the probe antenna 132, where the transmissions do not overlap by being, for instance, sequential to each other. The transmissions can also be scheduled to coincide with a period of reduced bandwidth load for the phased array antenna system 122. For each phased array antenna element, the probe antenna 132 receives a signal that corresponds to the transmission of the respective probe signal. The signal processing hardware 124 measures, for each phased array antenna element, a characteristic of the corresponding received signal, where the characteristic can include a phase and/or an amplitude of this signal. The signal processing hardware 124 also compares, for each phased array antenna element, the measured characteristic to a reference characteristic to determine a drift of the phased array antenna element. When the drift exceeds an allowable operating range, a calibration cycle is also scheduled to coincide with the period of reduced bandwidth load for the phased array antenna.

In some embodiments, the antenna control electronics 150 are in communication with a processor 180 and a data store 160 (e.g., a non-transitory memory) storing the reference data 162 as a data structure in the data store. The reference data 162 may include data (e.g., a reference characteristic) corresponding to each phased array antenna element 130 of the phased array antenna system 122. For example, each phased array antenna element 130 may be identified by a data label (e.g., a matrix index using row-column "n(i,j)" notation where "i" and "j" are nonzero positive integers) corresponding to a physical location of the phased array antenna element 130 in the phased array antenna system 122 in relation to the probe antenna 132. As an illustrative example, the phased array antenna system 122 includes thirty-six phased array antenna elements 130 arranged in a square array. The element occupying the corner nearest the probe antenna 132 may be referenced by index (1,1), whereas the farthest element may be referenced by index (36,36). In the preceding example, the reference data 162 includes at least one data entry per index. The data entry for the (1,1) index may include, for phased array antenna element (1,1), a reference phase of a received probe signal and/or a reference amplitude of the received probe signal. In some embodiments, the reference data 162 is defined using controlled measurement, simulation, and/or commissioning (e.g., factory testing and release) of the phased array antenna system 122 prior to launch (or another phased array antenna with a same design), and may be pre-stored in the data store 160 and/or may be updated via datalink subsequent to launch.

Figure 2:
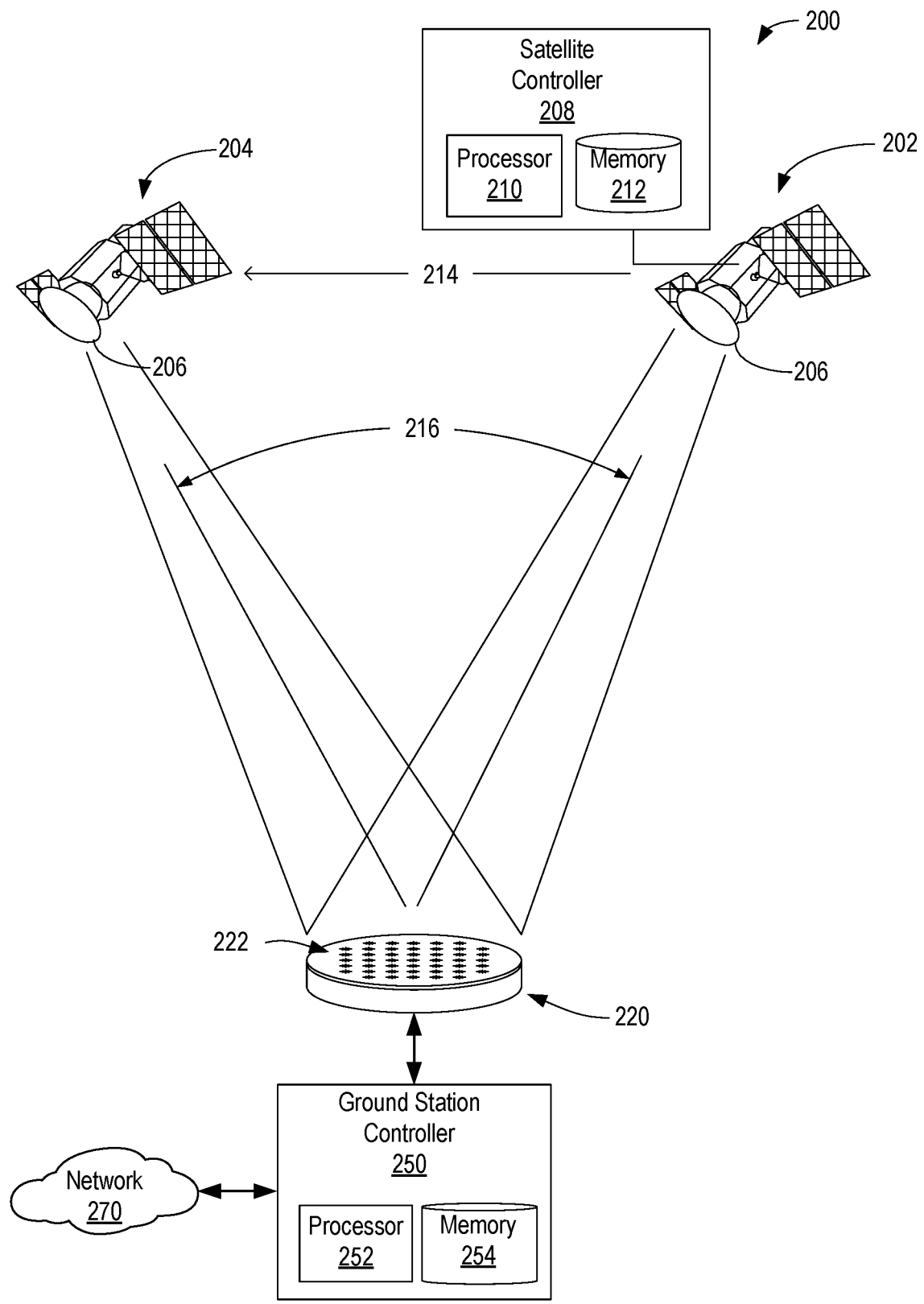
FIG. 2 illustrates an example of a satellite communications system including a ground station and satellite, according to embodiments of the present disclosure.

FIG. 2 illustrates an example of a satellite communications system 200 including a ground station 220 that includes a communications device and multiple satellites, according to embodiments of the present disclosure. The communications system 200 includes at least a first satellite 202 and a second satellite 204. The first satellite 202 proceeds along a path 214 corresponding to the first satellite's orbit around the earth. The path passes through an arc 216, which is a section of the cone defining the range of the ground station 220. While the first satellite 202 is within the arc 216, the first satellite can communicate with the ground station 220. The second satellite 204 is shown exiting the arc 216, thus exiting the range of the ground station 220.

It will be understood that the satellite communications system 200 can include any suitable number of satellites, which may be arranged to form a satellite communications network, and may be spaced in orbit so that a satellite of the satellite communications network is either always or routinely in range to communicate with any given ground station of the satellite communications system. Similarly, the satellite communications system 200 can include any suitable number of ground stations 220, which may be spaced geographically so that any particular ground station can be in communications with at least one satellite of a satellite communications network at any given time. The ground station 220 can be an end-user or consumer ground station programmed to receive data or media, including streaming media, from the satellite 202, or to upload data or media to the satellite; or the ground station 220 can be a commercial ground station programmed to upload data or media to a satellite network for distribution to end users or consumers.

Each one of the satellites 202, 204 includes a satellite antenna system 206 for communicating with the ground station 220, and a satellite controller 208 for decoding, processing, and encoding data for transmissions between satellites and between each satellite and the ground station 220 or other ground stations. The satellite antenna system 206 includes one or more phased array antennas, each one similar to or the same as the phased array antenna system 122, and one or more probe antennas, each one similar to or the same as the probe antenna 132 as described in more detail in reference to FIG. 1. The satellite controller 208 can include at least one processor 210 and at least one memory device 212 containing suitable executable instructions for receiving and processing communications data and for controlling the satellite antenna system 206 for receiving and/or transmitting data, for detecting whether an antenna drift has occurred, and for implementing a calibration of the phased array antenna. Signal processing hardware and signal processing methods are described below with reference to the figures, below.

The ground communications assembly 220 includes a phased array antenna 222 operably connected with signal processing hardware 224 for processing electrical signals sent to the phased array antenna for transmission from a ground station controller 250, and for processing electrical signals received from the phased array antenna for relaying to the ground station controller. The ground station controller 250 can include at least one computing system having a processor 252 and a memory device 254 containing executable instructions for controlling the phased array antenna 222. For example the ground station controller 250 can include storage media and/or networking devices for communicating with network 270 from which stored data can be accessed for transmission or to which transmitted data can be written upon receipt. The ground station 220 can include a calibration system similar to any of the satellites 202 and 204. Although not shown in FIG. 2, one or more probe antennas can be mounted to the phased array antenna 222 and used for the detection of antenna drift. Unacceptable antenna drift can trigger the ground station controller 250 to recalibrate the phased array antenna 222.

Figure 3:
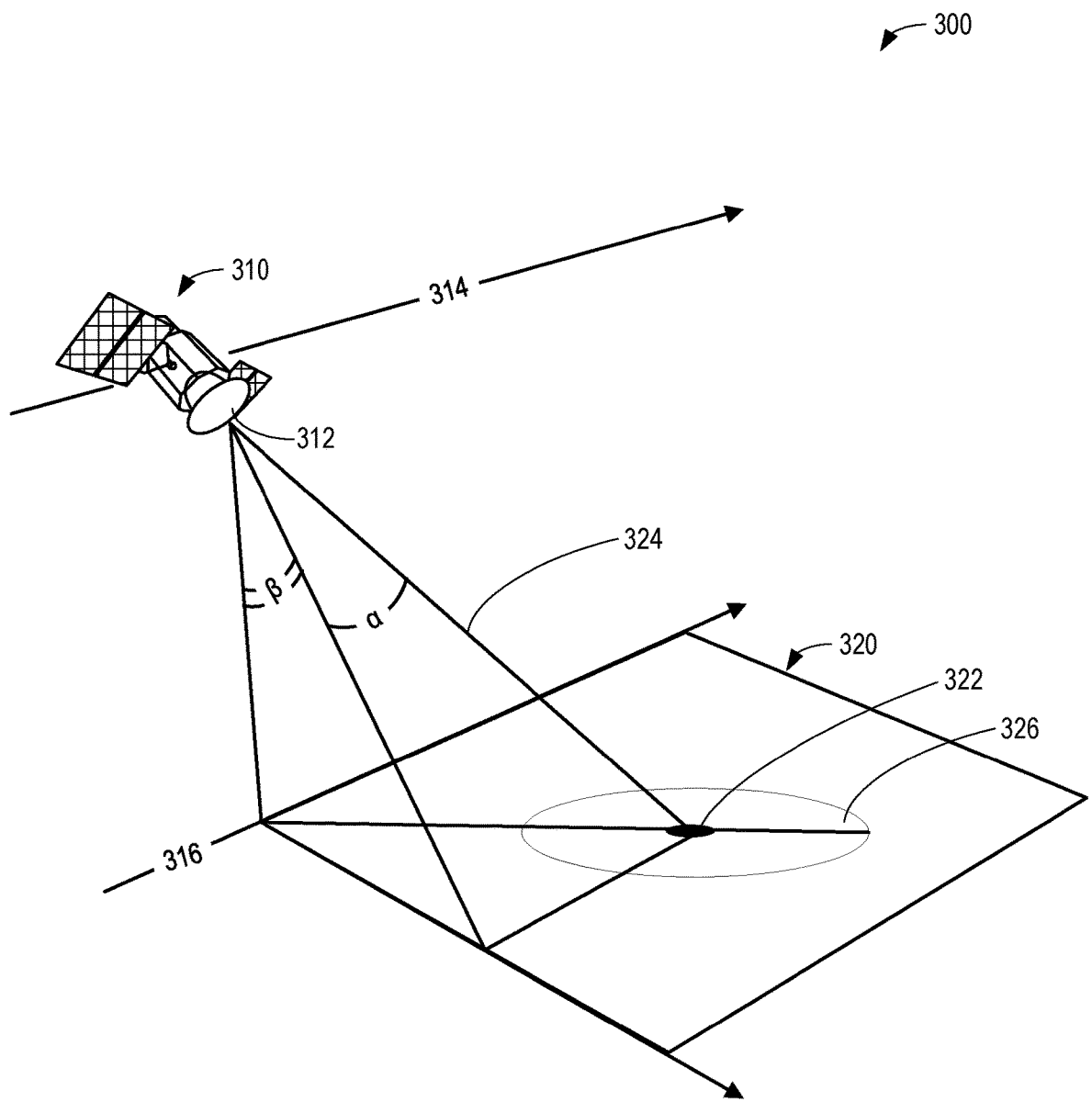
FIG. 3 illustrates another example of a satellite communications system including a steerable phased array antenna transmitter, according to embodiments of the present disclosure.

FIG. 3 illustrates another example of a satellite communications system 300 including a steerable phased array antenna transmitter and/or receiver, according to embodiments of the present disclosure. As described in reference to FIG. 2, the satellite communications system 300 illustrated in FIG. 3 includes a communications satellite 310 with an antenna system 312 including a phased array antenna system (not shown). FIG. 3 is not drawn to scale, such that elements are shown to emphasize clarity. In its orbit, the communications satellite 310 follows a path 314 the projection of which onto the surface of the Earth forms a ground path 316. In the example illustrated in FIG. 3, the ground path 316 and a projected axis extending orthogonally from the ground path 316 at the position of the communications satellite 310, together define a region 320 of the surface of the Earth. In this example, the communications satellite 310 is capable of establishing uplink and downlink communications with ground stations (e.g., ground station 220 of FIG. 2) within the region 320, as described in more detail in reference to FIG. 2. In some embodiments, the region 320 may be located in a different relative position to the ground path 316 and the position of the communications satellite 310. For example, the region 320 may describe a region of the surface of the Earth directly below the communications satellite 310. Furthermore, embodiments may include communications between orbiting satellites and/or between the communications satellite 310 and an airborne communications system.

As shown in FIG. 3, a communications target 322 is located within the region 320 (e.g., ground station 220 of FIG. 2). The communications satellite 310 controls the antenna system 312 to steer transmission and reception of communications signals to selectively communicate with the communications target 322. For example, in a downlink transmission from the communications satellite 310 to the communications target 322, a signal beam 324 emitted by the antenna system 312 is steerable within an area 326 of the region 320, as described in more detail in reference to FIG. 4, below. The extents of the area 326 define an angular range within which the signal beam 324 is steerable, where the direction of the signal beam 324 is described by a beam angle "α" relative to a surface normal vector of the antenna system 312. In two-dimensional phased array antennas, the signal beam 324 is steerable in two dimensions, described in FIG. 3 by a second angle "β" orthogonal to the beam angle α. In this way, the area 326 is a two-dimensional area within the region 320, rather than a linear track at a fixed angle determined by the orientation of the antenna system 312 relative to the ground path 316.

In FIG. 3, as the communications satellite 310 follows the path 314, the area 326 tracks along the surface of the earth. In this way, the communications target 322, which is shown centered in the area 326 for clarity, is within the angular range of the antenna system 312 for a period of time. During that time, signals sent between the communications satellite 310 and the communications target 322 is subject to bandwidth constraints, including but not limited to signal strength and calibration of the signal beam 324. As described in more detail in reference to FIG. 4, for phased array antenna systems, the signal beam 324 is generated by an array of mutually coupled antenna elements, wherein constructive and destructive interference produce a directional beam. Phase drift and/or amplitude drift (e.g., of a transmitted signal in a transmitter array), among other factors, affect the interference properties and thus the resultant directional beam. For that reason, calibration of each antenna element making up the antenna system 312 helps to increase or maximize the performance of the communications satellite 310, as described in more detail, below.

According to certain embodiments of the calibration system described herein, re-calibration of the antenna system 312 is scheduled to coincide with periods where no communications target 322 is within the area 326 wherein the communications satellite 310 can establish a communications link. As an example, the calibration system schedules the detection of antenna drift (e.g., phase drift and/or amplitude drift) during a time when the ground path 316 extends through an unpopulated region or a large body of water having reduced communications network infrastructure. Additionally or alternatively, upon determining an antenna drift that should trigger a calibration, the calibration system may schedule the performance of the calibration process during the time when the ground path 316 extends through the unpopulated region or the large body of water having reduced communications network infrastructure. Such scheduling takes advantage of reduced bandwidth loads associated with lower data traffic and reduces interference between the operations of the probe antenna and the phased array antenna elements.

Figure 4:
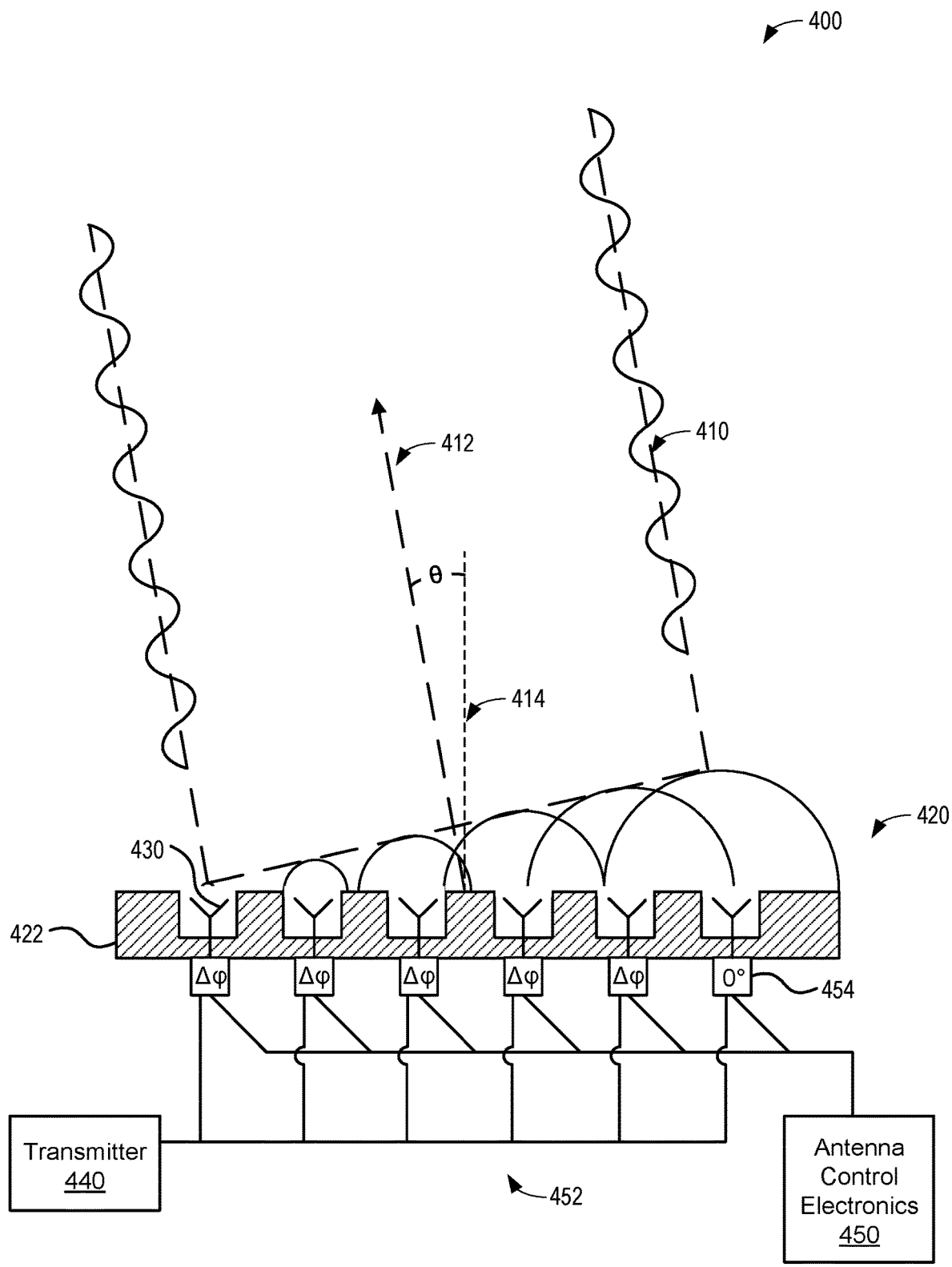
FIG. 4 illustrates a simplified side section schematic of a phased array antenna system, according to embodiments of the present disclosure.

FIG. 4 illustrates a simplified schematic of a phased array antenna system 400, according to embodiments of the present disclosure. In the phased array antenna system 400, as described in more detail in reference to FIGS. 5-9, below, interference between antenna elements forms a directional radiation pattern in both transmitter and receiver arrays (e.g., antenna system 312 of FIG. 3). As shown in FIG. 4, the phased array antenna system 400 includes a phased array antenna 420 that generates or receives transmissions as described by a beam 410 (beam extents shown as dashed lines). The beam 410 is a portion of a larger transmission pattern (not shown) that extends beyond the immediate vicinity of the phased array antenna system 400. The beam 410 is directed along a beam vector 412, described by an angle "θ" relative to an axis 414 normal to a surface of the phased array antenna 420. As described below, the beam 410 is steerable and/or shapeable through control of operating parameters including, but not limited to a phase and an amplitude of each antenna element.

In FIG. 4, the phased array antenna system 400 includes, within a transmitter section 422, a plurality of antenna elements 430, which may include, but are not limited to, omnidirectional transmitter antennas coupled to a transmitter system 440. The transmitter system 440 provides a signal, such as a downlink signal to be transmitted to a ground station on the surface, as described in more detail in reference to FIG. 2. The downlink signal is provided to each antenna element 430 as a time-varying signal that may include several multiplexed signals, as described in more detail below. To steer the beam 410 relative to the axis 414, the phased array antenna system 400 includes antenna control electronics 450 controlling an RF feeding network 452, including a plurality of signal conditioning components 454 interposed between the antenna elements 430 and the transmitter system 440. The signal conditioning components 452 introduce a phase modulation and/or an amplitude modulation, as denoted by "Δφ" in FIG. 4, to the signal sent to the antenna elements 430. As shown in FIG. 4, introducing a progressive phase modulation produces interference in the individual transmission of each antenna element 430 that generates the beam 410.

The phase modulation imposed on each antenna element will differ, and will be dependent on a spatial location of a communications target that determines an optimum beam vector (e.g., where the beam vector 412 is found by maximizing signal intensity and/or connection strength). As described in more detail in reference to FIG. 2, the optimum beam vector may change with time as the communications target moves relative to the phased array antenna system 400. In the phased array antenna system 400 shown in FIG. 4, a linear arrangement of antenna elements 430 provide an angular sweep in a plane aligned with the orientation of the phased array antenna 420. In the two-dimensional array systems described below, a second angular axis is added by modulating the phase shift applied to each antenna element and allowing the beam vector 412 to be set in two angular dimensions.

As shown in FIG. 4, the beam vector 412 and the beam shape depend on the phase modulation and amplitude modulation imposed by the antenna control electronics 450. As such, deviation from either modulation can introduce error in the performance of the antenna elements 430, and thus the phased array antenna 420 overall. Phase error can have a large effect on the beam depending on its statistical properties. If the phase error is uniformly distributed across the array, then the main beam direction does not change. Instead, nulls that are often used to block interference are severely affected, losing 10 dB to 20 dB. If there is a more deterministic (e.g., element-wise) phase error distribution, then this can steer the beam in a different direction, known as beam squint. Phase error can be caused by manufacturing tolerances in the RF feeding network 452, thermal effects (e.g., in the antenna control electronics 450, deformation of the transmitter section 422 and/or the antenna elements 430, etc.), and group delay variations in the signal conditioning components 454. In general, amplitude modulation error does not affect the beam vector 412, but rather affects the beam shape through the peak gain and sidelobe levels. Sidelobes form a part of the larger radiation pattern (not shown in FIG. 4), separated from each other by nulls where the signal intensity drops to zero. Higher sidelobe levels negatively impact the operation of the phased array antenna system 400 by wasting energy and causing interference with nearby electronics for transmitting arrays, and by picking up interfering signals and/or increasing the noise level in receiver arrays. Amplitude modulation error is generally caused by thermal effects in active components of the phased array antenna system 400, for example, by thermal effects in electronic components of the antenna control electronics 450 (e.g., power amplifiers or low-noise amplifiers).

Figure 5:
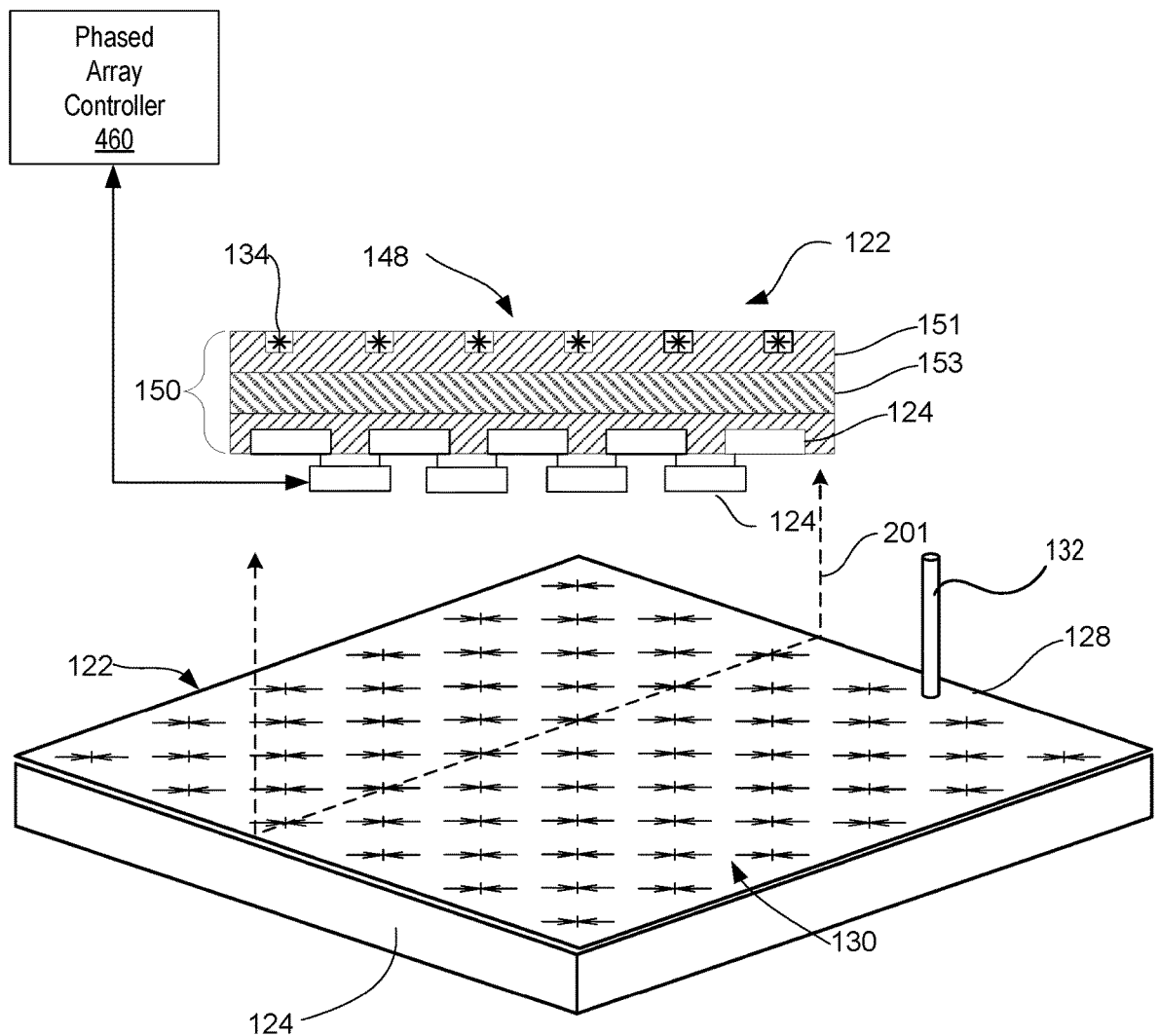
FIG. 5 illustrates another simplified side section schematic of another phased array antenna system, according to embodiments of the present disclosure.

FIG. 5 illustrates a simplified side section schematic of a phased array antenna system 122, according to embodiments of the present disclosure. In this figure, the same element numbers are used as the ones of FIG. 1 to illustrate embodiments of the phased array antenna system 122. As shown, the antenna substrate 128 can be a printed circuit board (PCB) 148 that electrically connects the antennas 134 with signal processing hardware 124, that is electrically connected with a phased array controller 560 (e.g., antenna control electronics 150 of FIG. 1). The printed circuit board 148 is shown in a simplified side section along plane 201 through the antenna substrate 128. It will be understood that FIG. 5 is a simplified representation showing the relative locations of components of the printed circuit board 148 that omits internal detail and is not to scale.

According to various embodiments, the printed circuit board 148 includes a plurality of layers 150 including at least a set of antenna layers 151 positioned at a superior surface of the antenna substrate 128, and a set of signal distribution layers 153 positioned beneath the antenna layers. According to some embodiments, signal processing hardware 124 can be microfabricated into the printed circuit board 148 as an additional set of layers beneath the signal distribution layers 153, can be microfabricated or installed on an inferior surface of the printed circuit board 148 beneath the signal distribution layers, or a combination of the above.

The set of antenna layers 151 at the superior surface of the antenna substrate 128 include the antennas 134, which are preferably microfabricated in or on the printed circuit board 148 in the same plane as each other. According to some embodiments, the transmitting and receiving antennas 134 can be formed by any suitable micro electromechanical system (MEMS) fabrication technique, such as, but not limited to: lithography, chemical etching, and/or deposition techniques. The antenna array 130 can be formed as a series of antenna elements (e.g. microstrip or dipole antenna elements, or other suitable microscale antenna elements) formed in a dielectric layer (or layers) of the set of antenna layers 151 and integrally connected or bonded with a silicon wafer containing a series of matching electrical connections of the signal distribution layers 153 configured to electrically connect the antenna layers 151 with the signal processing hardware 124.

Signal processing hardware 124 can include a series of antennas filters, signal conditioners, and power amplifiers configured to receive a signal for transmission from the phased array controller 560, relay and amplify the signal for transmission by the antennas 134 of the phased array antenna system 122. According to some embodiments, the signal processing hardware 124 can also take as input from the phased array controller 560 a target beam angle, and can delay the signal emission across any transmitting antennas according to their position on the antenna substrate 128 by a partial wavelength (e.g., impose a phase shift as described in reference to FIG. 4), the amount of delay between adjacent antennas corresponding to the beam vector (e.g. beam vector 412 of FIG. 4). The signal processing hardware 124 can include onboard processing (i.e. processors and memory containing software, hardcoded instructions, or firmware) that can process data from the ground station controller including the desired scan angle in order to automatically adjust the scan angle of transmission. Alternatively, the phased array controller 560 may process the target beam angle and generate instructions to directly control the delay of signal emission across the antennas 134 in order to control the scan angle of transmission.

Conversely, in the receiving case, the signal processing hardware 124 can sense electrical signals relayed from the antennas 134 that correspond to a received signal, and can rectify the received signal and relay the received signal to the phased array controller 560. According to some embodiments, the signal processing hardware 124 can listen to the signals received from the antennas 134 with a partial wavelength delay according to their position on the antenna substrate 128, the amount of delay between adjacent receiving antennas corresponding to the angle at which the phased array antenna is receiving.

The gain of the phased array antenna system 122 is related to the number of individual antenna elements in addition to their spacing and distribution on the antenna substrate 128. Therefore, according to various embodiments, the number of individual antenna elements may be maximized by arranging the antenna elements match the area of the substrate 128.

The phased array antenna system 122 includes a probe antenna 132, as part of the calibration system. While FIG. 5 is shown with a single probe antenna, in some embodiments, more than one probe antenna is mounted to the antenna substrate 128. In general, mounting refers to joining the probe antenna to the antenna substrate 128 in a fixed orientation, wherein the antenna electronically communicates with signal processing components of the calibration system on the anterior layers of the phased array antenna system 122 (e.g., the signal processing hardware 124). According to certain embodiments, mounting the probe antenna 132 includes connecting the probe antenna 132 to the phased array controller 560 via a switchable control circuit, such that the probe antenna is controllably deactivated and activated, such as by controllably being connected to a ground circuit such as to be in an idle mode where the probe antenna cannot transmit or receive a signal or reversibly disconnected from the ground circuit such that the probe antenna can transmit or receive a signal.

The phased array antenna system 122 is described herein as a transmitter and/or a receiver, but embodiments are not limited as such. According to certain embodiments, the phased array antenna system 122 can be a dedicated transmitter, in which case the probe antenna 132 is a dedicated receiver antenna. According to certain embodiments, the phased array antenna system 122 can be a dedicated receiver, in which case the probe antenna 132 is a dedicated transmitter. In embodiments wherein the phased array antenna system 122 includes both transmitter and receiver elements, the probe antenna 132 may be both a transmitter and a receiver, or the phased array antenna system 122 may include a transmitter probe antenna and a receiver probe antenna.

In some embodiments, transmission of the probe signal between probe antennas and phased array antenna elements is coordinated with transmission processes of the communications system (e.g., uplink, downlink, and/or side-link transmission of a signal to another communication system, such as to a ground station, a satellite communication system, a user terminal, or other types of communication system). The phased array controller 560 may implement a multiplexing protocol based on one or more techniques to permit measuring the probe signal without interfering with the transmission processes. Also referred to as collision between the calibration system and the communications system.

In one example, orthogonal frequency division modulation (OFDM) may be implemented to prevent collision between transmissions of the calibration system and the communications system (e.g., between the probe signal and the signal transmitted to the other communication system including, for instance, a user terminal or a ground station). OFDM is implemented by dividing a signal into multiple superimposed sub-carrier signals, equally spaced in the frequency domain in such a way that the sub-carrier signals are orthogonal. In this context, orthogonality indicates a sum-zero interference contribution from sidebands and preserves the subcarrier signals. For orthogonal frequency division modulation, the sub-carrier spacing is equal to an integer multiple of the reciprocal of the symbol period, where the integer multiple is usually one. The symbol period is an inverse frequency having units of seconds that describes the time associated with transfer of a data unit (e.g., a number of bits) under the operating parameters of the antenna system. Demodulation of multiplexed signals is achieved by transforming the signal, (e.g., by fast Fourier transform or other analogous techniques), to isolate each subcarrier by its main frequency. As applied to the communications system, the probe signal may be modulated to an unoccupied sub-carrier frequency, such that it does not interfere with normal operation of the communications system.

In another example, time division multiplexing, (e.g., time division multiple access (TDMA)) may be implemented to prevent collision between transmissions of the calibration system and the communications system. As would be understood by a person having ordinary skill in the art, time division multiple access includes the transmission of frame over a frequency shared between different systems, where the frame is divided into timeslots, and the signal of each signal is transmitted at different timeslots within the frame. The systems are allocated a number of time slots, in some cases separated by guard periods. As applied to communications system the probe signal may be transmitted at a number of timeslots, whereas the signal transmitted to another communication system (e.g., including a user terminal or a ground station) can be transmitted at number of different timeslots, thereby sharing the same frequency. While both frequency modulation and time division multiplexing techniques are discussed, a person having ordinary skill would recognize alternatives or variations, for example, by using code-division multiple access (CDMA) multiplexing.

Figure 6:
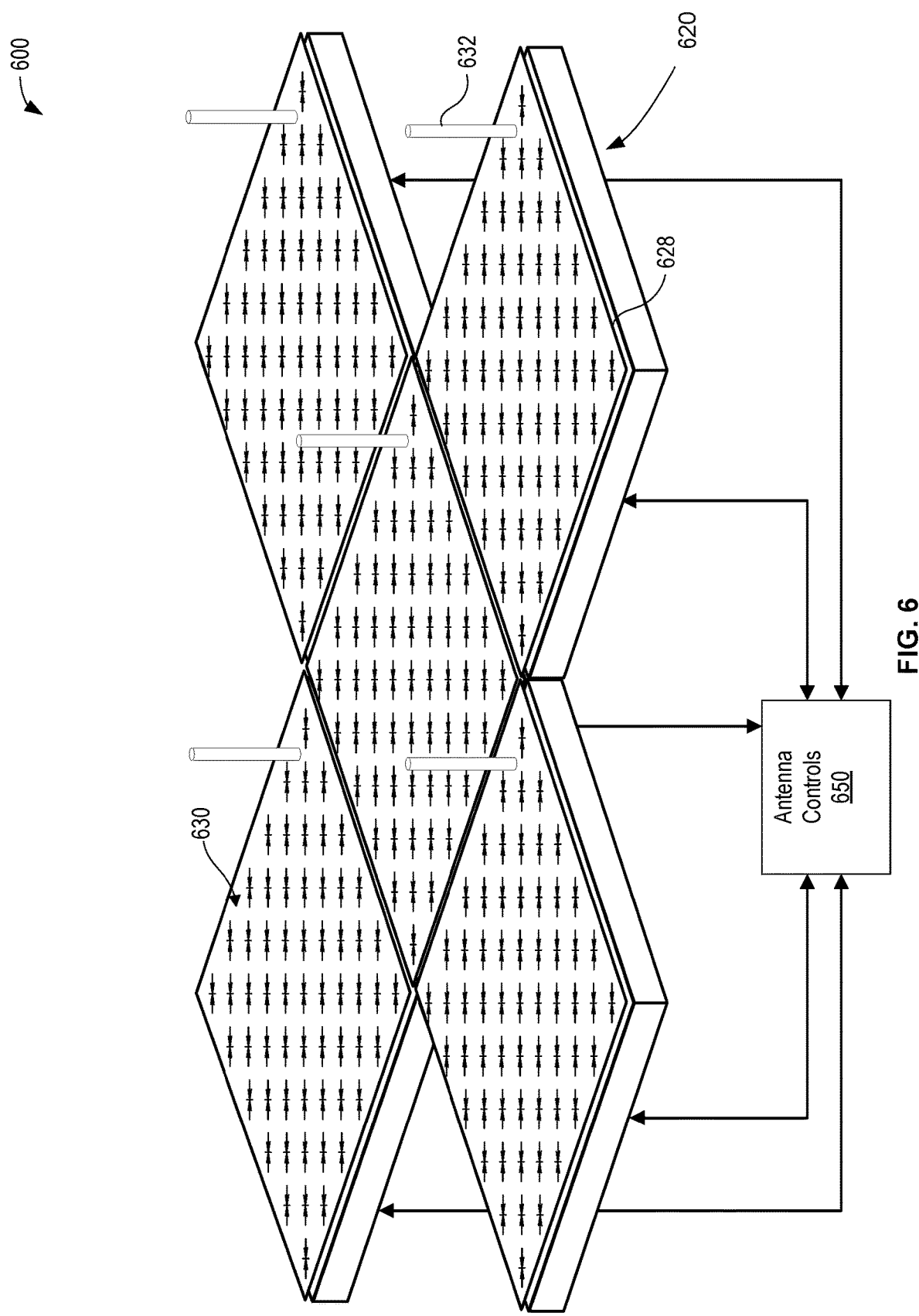
FIG. 6 illustrates an example of a communications system including multiple phased array antenna tiles with multiple probe antennas, according to embodiments of the present disclosure.

FIG. 6 illustrates an example of a communications system 600 including multiple repeated phased array antenna units, also referred to as tiles, with multiple probe antennas, according to embodiments of the present disclosure. In some embodiments, a phased array antenna (e.g. phased array antenna system 122 of FIG. 1) includes multiple phased array antenna tiles 620, each including arrayed antenna elements 630. In some embodiments, each tile also includes a probe antenna 632 mounted to the antenna substrate 628. In some embodiments, the phased array antenna tiles 620 are mounted to a common support structure as part of a satellite communications system (e.g., satellite antenna system 206 of FIG. 2). The phased array antenna tiles 620 may be controlled by antenna controls 650, including the signal conditioning electronics and/or the computer control systems described above. In some embodiments, the antenna controls 650 include a calibration system using the probe antennas to measure a drift in phased array antenna elements 630 making up the phased array antenna tiles 620.

In some embodiments, phased array antenna calibration is implemented as part of a monitoring procedure facilitated by the transmission and/or reception of a probe signal communicated between the probe antenna 632 and the arrayed antenna elements 630. The probe signal may include, but is not limited to, a signal having known phase and amplitude characteristics. Measuring the signal as received, either by the arrayed antenna elements 630 for a phased array antenna receiver or by the probe antenna 632 in a phased array antenna transmitter, may permit the antenna controls 650 to determine a drift between the known phase and amplitude characteristics (e.g., reference characteristics) and the measured phase and amplitude characteristics (e.g., measured characteristics). In some embodiments, the antenna controls 650 may apply a phase shift and amplitude modulation to elements at any position such that the combined phased array antenna making up the communications system 600 produces a beam with the desired shape and direction at a given time, as described in more detail in reference to FIGS. 9 and 10.

In some embodiments, a given phased array antenna element of the arrayed antenna elements 630 can communicate with multiple probe antennas. As an illustrative example, a receive element can receive a probe signal from more than one probe antenna. Differences in measured characteristics of the multiple received probe signals can be used for redundancy and/or improvement of measurement accuracy (e.g., through error compensation, filtration, smoothing, etc.). In some instances, redundancy may result in conflict between two received probe signals (e.g., when the phase and/or amplitude of two received probe signals are very different). Such conflict also permits identification of errors in operation of the calibration system, for which there is a conflict resolution process, as described in more detail in reference to FIG. 8. Additionally or alternatively, it may be inferred from signal conflict that a probe antenna may not be working properly, as described in more detail in reference to FIG. 8, in which case an inoperative probe antenna can be taken offline and no longer used.

Figure 7:
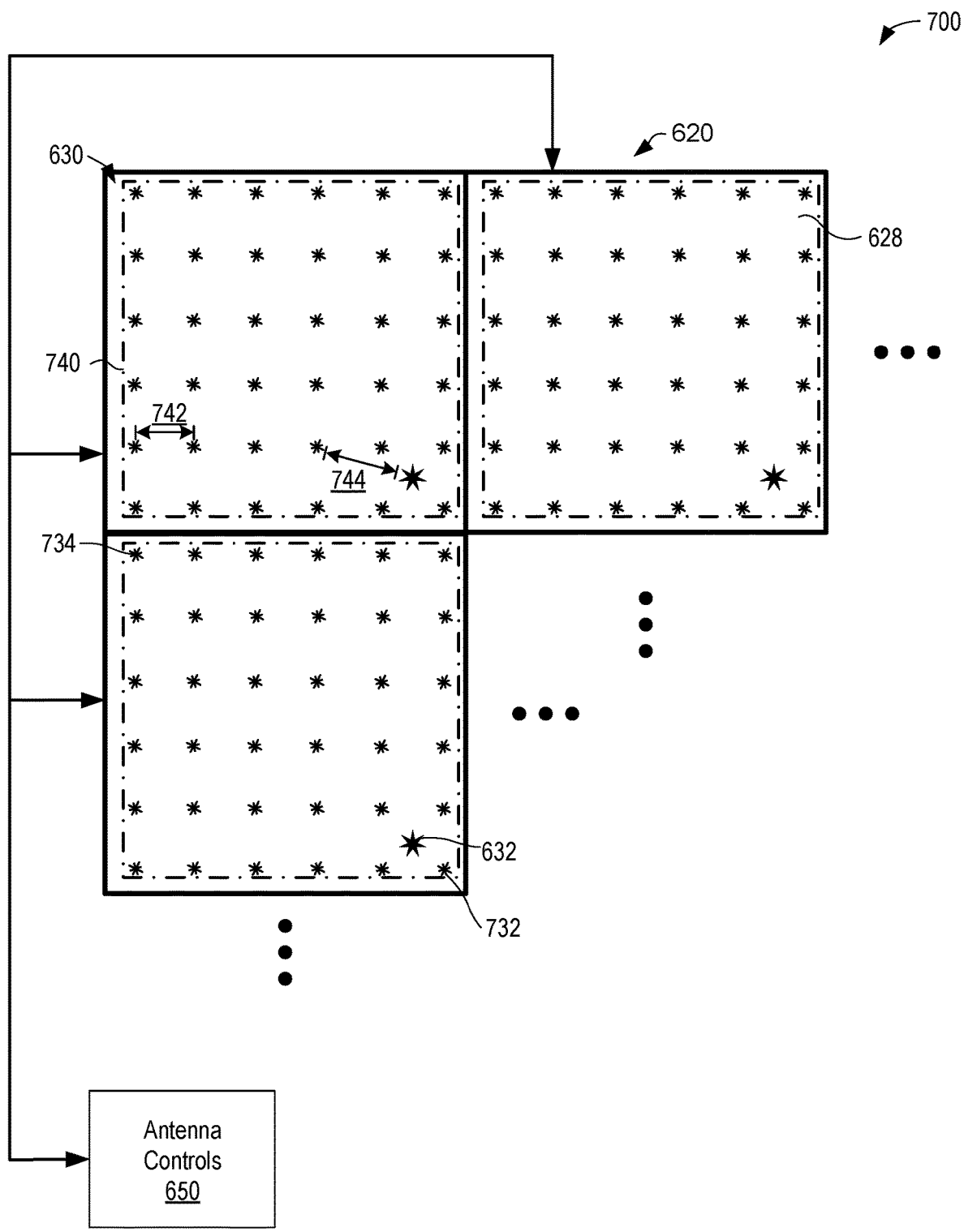
FIG. 7 illustrates another example of a communications system including multiple phased array antenna tiles with multiple probe antennas, according to embodiments of the present disclosure.

FIG. 7 illustrates another example of a communications system 700 including multiple phased array antenna tiles with multiple probe antennas, according to embodiments of the present disclosure. In the plan view illustrated in FIG. 7, multiple phased array antenna tiles 620 are in communications with an antenna control system 650, such that each of the phased array antenna tiles 620 operates as part of a single phased array antenna. The satellite communications system 700 may include a transmitter array and/or a receiver array, by which more than one set of phased array antenna tiles may be included in the satellite communications system 700. In some embodiments, the phased array antenna tiles 620 may include phased array antenna elements 630 and a probe antenna 632. In general, the calibration system includes an optimum number of probe antennas, such that some phased array antenna tiles 620 may not include a probe antenna 632. In some embodiments, as described in more detail in reference to FIG. 8, below, a number of probe antennas is selected and their individual orientations chosen to provide coverage for every phased array antenna element to be within range of at least one probe antenna.

The phased array antenna elements 630 may be spaced apart (shown as a grid spacing 742) on the phased array antenna substrate 628 to minimize undesired interference as well as to facilitate operation of the phased array antenna as described in more detail in reference to FIGS. 4-5. As a result of the spacing of phased array antenna elements 630, the probe antenna 632 will have a nearest antenna element 732 and a farthest antenna element 734. In other words, the probe antenna will be at a distance 744 away from each one of the phased array antenna elements and this distance 744 can vary depending on each phased array antenna element. The phased array antenna elements may be arranged in a grid 740, separated by a set grid spacing 742, which may be a function of the operating wavelength of the phased array antenna. The distance 744 of each phased array antenna element to the probe antenna 632 impacts the coupling of the phased array antenna element with the probe antenna 632 and, thus, the characteristic of the signal received by the phased array antenna element in response to a transmission of a probe signal from the probe antenna 632 or received by the probe antenna 632 in response to a transmission of a probe signal from the phased array antenna element.

The spacing of individual antenna elements in a phased array antenna is driven in part by the desired transmission frequency of the array, and may be limited by the thermal load produced by individual phased array antenna elements 630 and the ability of the antenna substrate 628 to conduct heat away from the phased array antenna elements 630. For this reason, the radiation pattern of the probe antenna included in the calibration system depends at least in part on the thermal properties of the phased array antenna. Thermal loading may drive the spacing of the phased array antenna elements 630 in the grid 740 for closer arrangements, for example, at higher operating frequency bands. As such, there is a trade-off between design of the calibration system and the design criteria for controlling thermal loading.

FIG. 7 shows the phased array antenna tiles 620 as rectangular, with phased array antenna elements 630 arranged in a regular grid 740. In some embodiments, however, the phased array antenna tiles 602 may have additional or alternative arrangements including, but not limited to circular, hexagonal, triangular, rhomboid or other quadrilateral arrays, and so on. Grid arrangements may depend on external factors, such as form factor constraints, structural limitations, or other aspects of system design for the communications system 700.

Figure 8:
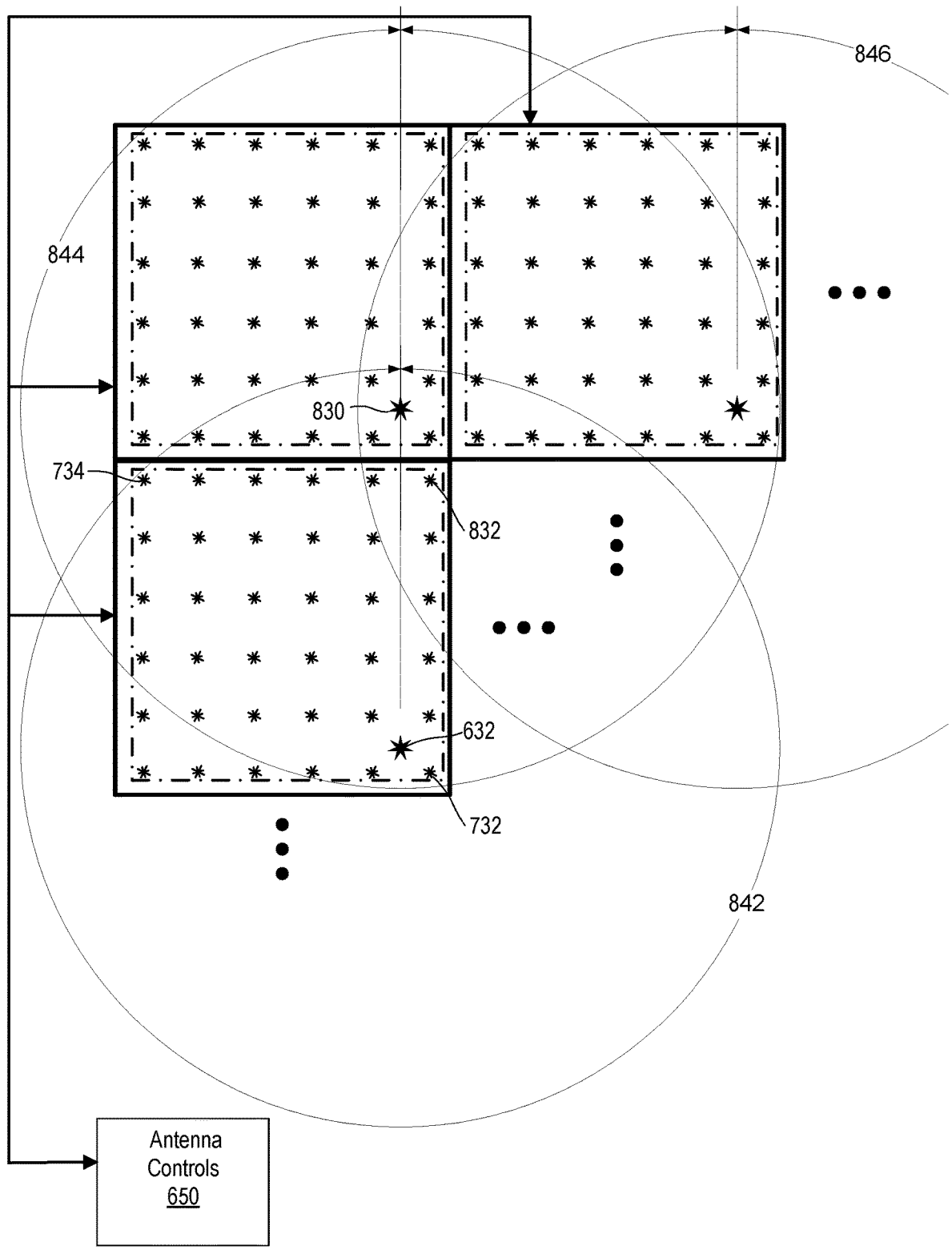
FIG. 8 illustrates a communications system including a probe antenna and a phased array antenna, according to embodiments of the present disclosure.

FIG. 8 illustrates a communications system 800 including a probe antenna and a phased array antenna, according to embodiments of the present disclosure. In reference to FIG. 7, a phased array antenna including multiple tiles was described. FIG. 8 further describes redundant coverage of the phased array antenna by probe antennas included in the calibration system, whereby a given phased array antenna element can be (but is not necessarily) within range of multiple probe antennas (e.g., line of sight). In FIG. 8, the communications system 800 is illustrated having multiple phased array antenna tiles (e.g., phased array antenna tiles 620 of FIG. 6) including antenna elements laid out in a square grid and a probe antenna. In the example shown in FIG. 8, the probe antenna 632 is mounted to the phased array antenna tile near the lower-right corner, such that it is nearer to the nearest element 732 and farther from the farthest element 734. In this way, probe antennas mounted to adjacent phased array antenna tiles may be nearer to the farthest element 734 than the probe antenna 632. In some embodiments, each probe antenna is identical with regard to operational parameters including, but not limited to operating frequency band and antenna length. In some embodiments, the probe antennas are mounted in the same relative location on each tile, and each tile is oriented such that the probe antennas are arranged in a grid having a spacing equal to the width of the phased array antenna tiles. In some embodiments, the probe antennas are mounted in different relative locations on each tile or each tile is differently oriented, for example, such that the probe antennas are mounted around the periphery of the combined phased array antenna. As described previously, the probe antenna may interfere with the operation of the phased array antenna under some circumstances, for example, through mutual coupling between the phased array antenna elements and the probe antennas that may have an undesired effect on phased array antenna operating parameters such as introducing beam squint.

As shown in FIG. 8, the phased array antenna elements are each within range of at least one probe antenna. As described above in reference to FIG. 7, the calibration system may include an optimized number of probe antennas such that each phased array antenna element is within range of at least one probe antenna. In some embodiments, the probe antennas are mounted to the phased array antenna tiles in such a way that each antenna element is within range of at least two probe antennas. For example, the nearest element 732 is within a first range 842 associated with the probe antenna 732 and a second range 844 associated with a second probe antenna 830 mounted to an adjacent phased array antenna tile. Similarly, a peripheral antenna element 832 on the same phased array antenna tile as the probe antenna 632 is within the first range 842, the second range 844, and a third range 846 of yet another probe antenna mounted to an adjacent phased array antenna tile. In some embodiments, as shown in FIG. 8, one or more phased array antenna elements are nearer to the second probe antenna 830 than the probe antenna 632, indicating higher signal strength during transmission and/or reception of a probe signal used in calibration.

Overlapping ranges from multiple probe antennas included in the communications system 800 permit redundant measurement of a probe signal communicated between a single phased array antenna element and multiple probe antennas. For example, if the phased array antenna shown in FIG. 8 is a transmitter array, the peripheral antenna element 832 may transmit the probe signal to three probe antennas within range of the peripheral antenna element 832. Each probe antenna may then receive the probe signal, where the strongest signal can be received by the second probe antenna 830, and the probe antenna 632 can have the second strongest signal. In some embodiments, the antenna controls 650 can select the strongest probe signal for measuring the phase and amplitude of the probe signal, to provide the optimal determination of signal drift. The distance over which the probe signal is transmitted introduces a range of strengths over which the probe signal is measured, in proportion to the grid spacing and the number of phased array antenna elements within range of the respective probe antenna. Other approaches to signal selection include, but are not limited to, rejecting signals below a predefined signal strength, combining by one or more techniques signals having sufficient strength, filtration of signals generated by malfunctioning probe antennas, or the like. Combination techniques may include, but are not limited to, weighted averaging of two or more signals, where signal strength forms at least one parameter of the weighting factor used, as described in more detail in reference to FIG. 12. In some embodiments, a pattern of drift as measured by a nearer probe antenna may prompt the calibration system to select measurements from a farther probe antenna, despite the decreased signal strength. For example, the nearer probe antenna may measure a drift outside the allowable range for numerous antenna elements, for which a number of farther probe antennas measure lesser drift, and are in agreement. In some cases, where the nearer probe antenna demonstrates a pattern of over-measuring the drift of the antenna elements (e.g., if a fraction of antenna elements above a given number are in conflict with comparative measurements), the calibration system may select between measurements generated by farther probe antennas.

In some embodiments, redundant measurements permit determination of probe antenna function, as described in reference to FIG. 12, below. Multiple received probe signals associated with different probe antennas and different phased array antenna elements may be compared to identify error introduced to the signal by malfunction of a probe antenna, as opposed to other sources (e.g., antenna element de-calibration or background noise). In some cases, once identified, the malfunctioning probe antenna is deactivated and excluded from further use in the calibration system.

Figure 9:
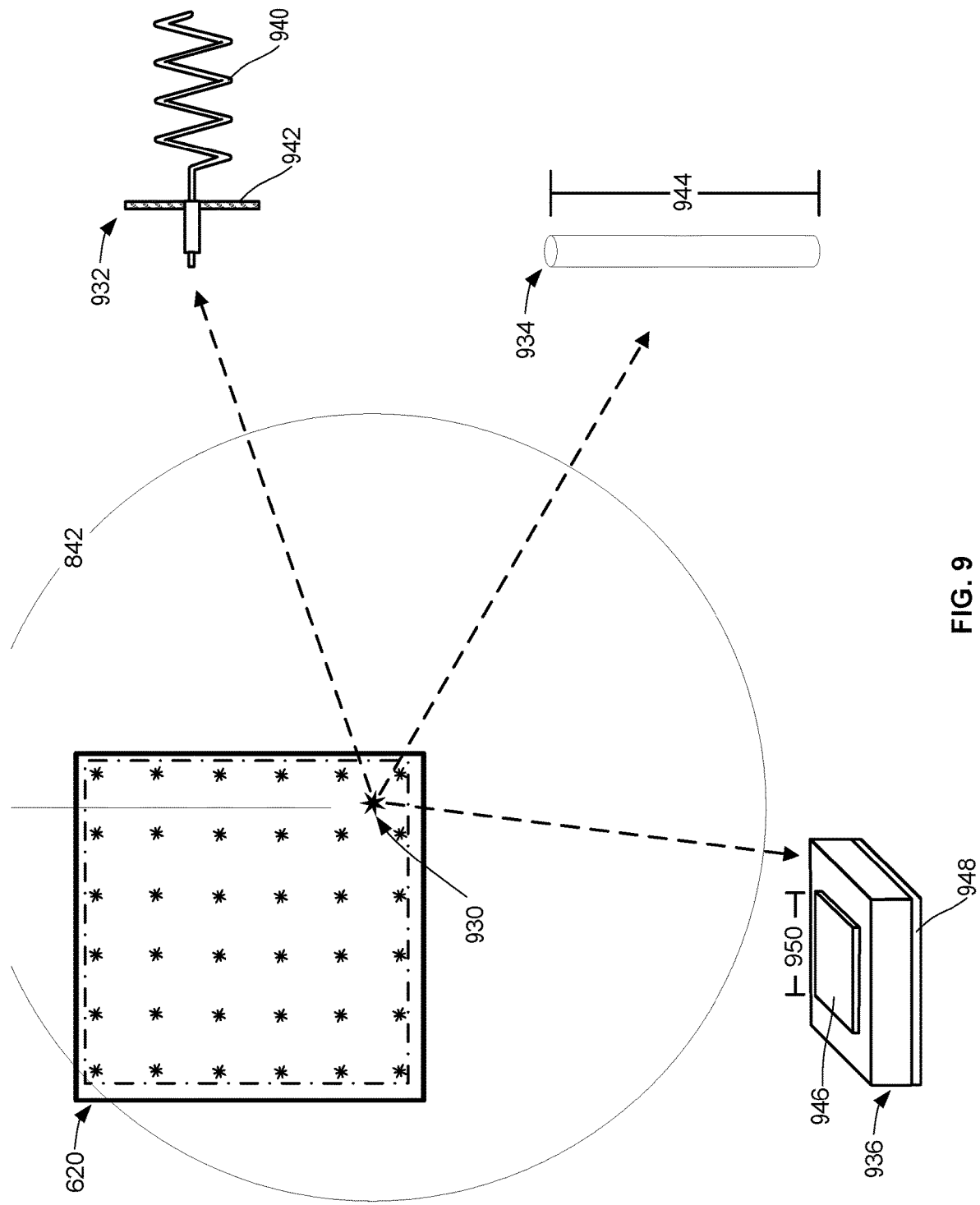
FIG. 9 illustrates hardware configurations of a probe antenna, according to embodiments of the present disclosure.

FIG. 9 illustrates hardware configurations of a probe antenna, according to embodiments of the present disclosure. As described in more detail, above, the phased array antenna tile 620 may include a probe antenna 930 (e.g., probe antenna 632 of FIG. 6). Placement of the probe antenna may depend on competing design criteria, for example, to minimize interference with the operation of the phased array antenna caused by the probe antenna 930 while also ensuring coverage of every phased array antenna element by at least one probe antenna. In this way, the probe antenna 930 may be placed such that the probe signal must be communicated across a range of distances between the probe and the phased array antenna elements. The range of distances introduces a range of signal strengths of the probe signal as received by the antenna control electronics (e.g., antenna control electronics 650 of FIG. 6). Consequently, signal processing electronics must be designed such that the antenna control electronics can automatically (e.g., without user input and/or control) analyze the probe signal as received by the antenna control electronics, and determine measurements of phase and amplitude. Such a determination may involve transformations including, but not limited to, noise filtering, de-modulation, and other processing techniques that are more challenging for a weaker signal than for a stronger signal. In this way, the design of the probe antenna 830 includes reducing the complexity of signal processing electronics.

The probe antenna 930 is not restricted to a single structure. Instead, any structure that provides an omnidirectional radiation pattern may be suitable. In some embodiments, the probe antenna 930 is a helical antenna 932. Helix antennas include a helical radiating wire 940 and a reflecting ground plane 942. In general, the radiation pattern for the helical antenna is a function of the circumference of the helical radiating wire 940 and the pitch (the axial distance between the turns) of the helical radiating wire 940. In some embodiments, the helical antenna 932 has a circumference significantly less than the a wavelength and a pitch significantly less than a quarter-wavelength, in which case the helical antenna 932 functions as a normal-mode helix. The radiation pattern of a normal-mode helix is omnidirectional, radiating equal power in all directions perpendicular to the axis of the helical antenna 932.

In some embodiments, the probe antenna 930 is a monopole antenna 934. As described above, the monopole antenna 934 may have a characteristic length 944 upon which its radiation pattern depends. For example, in a resonant configuration, the characteristic length 944 is equal to one quarter of the wavelength corresponding to the operating frequency of the monopole antenna 934. While resonance provides ideal far-field performance for the monopole antenna 934, the radiation pattern of the resonant configuration provides a smaller lateral range 842 and higher dynamic range. For that reason, the monopole antenna 934 may have a characteristic length 944 that approaches a half-wavelength of the operating frequency (e.g., the frequency of the probe signal). With increasing characteristic length 944, the radiation pattern of the monopole antenna becomes less suitable for far-field emission, but exhibits a wider lateral range 842 and a smaller dynamic range. Such configurations, where the characteristic length 944 is between a quarter-wavelength and a half-wavelength, are termed over-resonant. An over-resonant configuration may degrade return loss as compared to the resonant configuration and relatively more difficult impedance matching constraints. In some embodiments, matching circuits are included to compensate for this increased difficulty, and to compensate for the degraded return loss. For example, within a frequency range of 28.5 and 30.0 GHz, a monopole antenna having a characteristic length of $0.42\lambda$, where "$\lambda$" is a wavelength corresponding to a frequency within the frequency range, may fall from a range of between −3 dB to −4 dB to a range of between −7 dB to −8 dB by changing from a matching impedance of fifty Ohms to a matching impedance of one-hundred Ohms. For this reason, in some embodiments of the present disclosure the monopole antenna 934 has a characteristic length between $0.25\lambda$ and $0.45\lambda$, such that the monopole antenna 934 is over-resonant.

In some embodiments, the probe antenna 930 is a patch antenna 936. The patch antenna 936 may include a radiating plane 946 and a ground plane 948, separated by a distance, typically filled with a dielectric material spacer. As with the monopole antenna 934, the patch antenna has a characteristic length 950 that determines the radiation mode of the patch antenna 934. The resonant mode of the patch antenna 936 occurs at a characteristic length 950 slightly less than one-half wavelength in the antenna ($\lambda/2$ less the distance between the radiating plane 946 and the ground plane 948) corresponding to the operating frequency (as opposed to the wavelength in free space). Similar to the discussion of the monopole antenna 934, above, the patch antenna 936 may be designed to provide a suitable lateral range 842 and dynamic range to cover every phased array antenna element in the phased array antenna tile 620 with simplified signal processing components.

Figure 10:
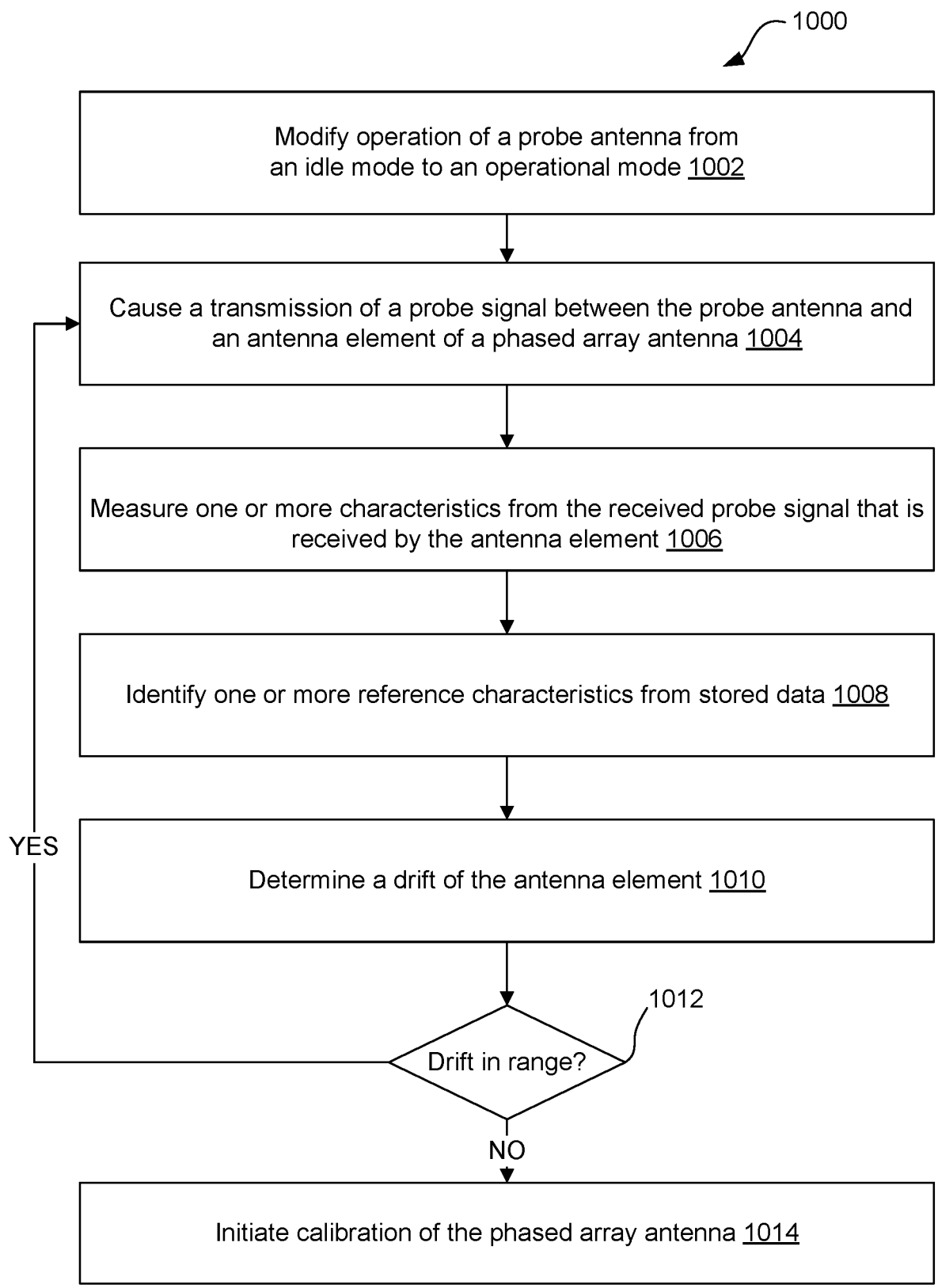
FIG. 10 illustrates an example flow for measuring drift of a phased array antenna by using a probe antenna, according to embodiments of the present disclosure.

FIG. 10 illustrates an example flow 1000 for a method of measuring drift of a phased array antenna system that includes a phased array antenna, a probe antenna, and a computer system, according to embodiments of the present disclosure. The computer system can include the signal and processing hardware 124 of FIG. 1. The method includes modifying, by the computer system, an operation mode of the probe antenna from an idle mode to an operational mode (1002). As described in more detail in reference to FIG. 1, in the idle mode, the probe antenna (e.g., probe antenna 132 of FIG. 1) may be deactivated and, in the operational mode, the probe antenna is activated. The operational mode can be a transmission mode or a receiving mode. In the transmission mode, the probe antenna transmits a probe signal to a plurality of the antenna elements of the phased array antenna. In the receiving mode, the probe antenna receives a signal in response to a transmission of a probe signal from an antenna element of the phased array antenna. The probe antenna may be an omnidirectional monopole antenna in an over-resonant transmission configuration, as described in more detail in reference to FIG. 9, and may be mounted to a phased array antenna and/or a phased array antenna tile.

The method also includes causing, by the computer system, a transmission of a probe signal between the probe antenna and an antenna element of a phased array antenna (1004). In the transmission mode of the probe antenna, the probe signal is transmitted at once to all the antenna elements. And each antenna elements receives a signal in response to the transmission of the probe signal. In the receiving mode of the probe antenna, each antenna element transmits a probe signal and the probe antenna receives a corresponding signal. The various transmitted probe signals can have the same characteristic (e.g., phase and/or amplitude). As described in more detail above, a probe signal may have known phase and amplitude characteristics. A received signal is used herein to describe the signal received in the transmission mode or the receiving mode in response to a transmission of a probe signal. Upon further processing of each received signal (e.g., filtering, amplification, analog to digital conversion, etc.), the computer system may be record and store this signal (e.g., digital data that represents the signal) in association with that antenna element (e.g., by using the index (i, j) of the antenna element).

The method also includes measuring, by the computer system, one or more characteristics of each received signal (1006). For instance, the phase and/or amplitude of this signal may be measured. Measuring may include one or more filtering and deconvolution techniques. The phase and/or amplitude of each phased array antenna element are characteristics that determine the operation of the phased array antenna, as described in reference to FIG. 4. A phase shift of a phased array antenna element introduces interference that results in a directional radiation pattern by which the phased array antenna can scan a signal beam. The amplitude of each phased array antenna element is calibrated to provide a desired beam shape and to control the intensity of sidelobes in the radiation pattern, which may reduce antenna efficiency and interfere with other neighboring electronics. In an example, multiple signals are received, one per antenna element. The characteristics of the different received signals (e.g., each phase and/or amplitude) are similar because the probe antenna is an over-resonant antenna. In particular, a first characteristic of a first received signal (e.g., a signal corresponding to the antenna element closest to the probe antenna) is different from a second characteristic of a second received signal (e.g., a signal corresponding to the antenna element farthest from the probe antenna). Yet, the difference is within a small difference range, such that the signals can be processed by the antenna system having a small dynamic range (e.g., the second characteristic is a within a threshold range of the first characteristic, such as the ratio of the two characteristics is ten percent or less).

The method also includes identifying one or more reference characteristics from stored data (1008). The reference characteristics may include a reference for the phase and a reference for the amplitude of the received signal per antenna element. The stored data (e.g., the reference data 162 of FIG. 1) may take the form of a lookup table stored locally to the computer system (e.g., on a non-transitory memory of the computer system). In this way, some embodiments of the present disclosure may include comparing, for each received signal, the measured phase and/or amplitude of the received signal to an entry in the lookup table for the corresponding antenna element.

The method also includes determining a drift of each of the antenna elements (1010). For each antenna element, the computer system may determine a phase offset between the measured phase and the reference phase, for example as a difference between the two. Similarly, and for each antenna element, the computer system may determine an amplitude offset, for example, as a ratio of peak amplitude of the received signal and the reference amplitude defined for the antenna element in the lookup table (e.g., to account for background and/or baseline signal components). The drift may then be determined for each antenna element of the phased array antenna as a function of the phase offset, the amplitude offset, or both.

Additionally or alternatively, the drift may be determined for the entire phased array antenna by calculating an overall radiation pattern for a simulated transmission using the phase shift and an amplitude offset for each antenna element. The phase shift and amplitude offset for each element may serve as inputs to a numerical model of the antenna, such that an overall drift of the beam angle may be determined.

The method also includes determining whether the drift is within an allowable range (1012). As described above, the allowable range may be predefined as an allowable accuracy or operational margin of phase shift or amplitude offset for each antenna element. In such cases, the determination may include determining a number of antenna elements for which the drift is within the allowable range, as compared to the number for which the drift is outside the allowable range. Alternatively, the drift may describe an angular offset (e.g., beam squint) determined using a simulated and/or measured beam produced by the phased array antenna. In such cases, the allowable range may describe an angle (e.g., in radians, degrees, etc.) within which the phased array antenna operates nominally. In general, the allowable range, both for each antenna element and for the phased array antenna overall, depends on numerous factors, including, but not limited to the number of antenna elements, the position of a given antenna element, or the beam angle. While the drift remains within the allowable range, the computer system may periodically cause re-transmissions of probe signal and measurements of characteristics of received signal determine the drifts. In some embodiments, the periodic measurement may include, but is not limited to, a continuous cycle, a scheduled cycle, or a cycle triggered by drift measured in a single element. Additionally or alternatively, the periodic measurement can be scheduled to coincide with a time where additional bandwidth may be available or where no use traffic is being communicated. For example, in a satellite communications system, this time corresponds to when an orbiting satellite is orbiting over a large body of water, the data load is generally reduced.

The method also include initiating calibration of the phased array antenna (1014). In cases where the drift is outside the allowable range, the calibration may include modulating the phase shift applied to each antenna element of the phased array antenna, as described in more detail in reference to FIG. 4. The calibration may also include modulating an amplitude of each antenna element to correct for drift affected by amplitude offset. The calibration may be postponed and/or scheduled to coincide with the time where additional bandwidth may be available or where no use traffic is being communicated.

It should be appreciated that the specific steps illustrated in FIG. 10 provide a particular method of measuring drift of a phased array antenna by a probe antenna according to an embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications.

Figure 11:
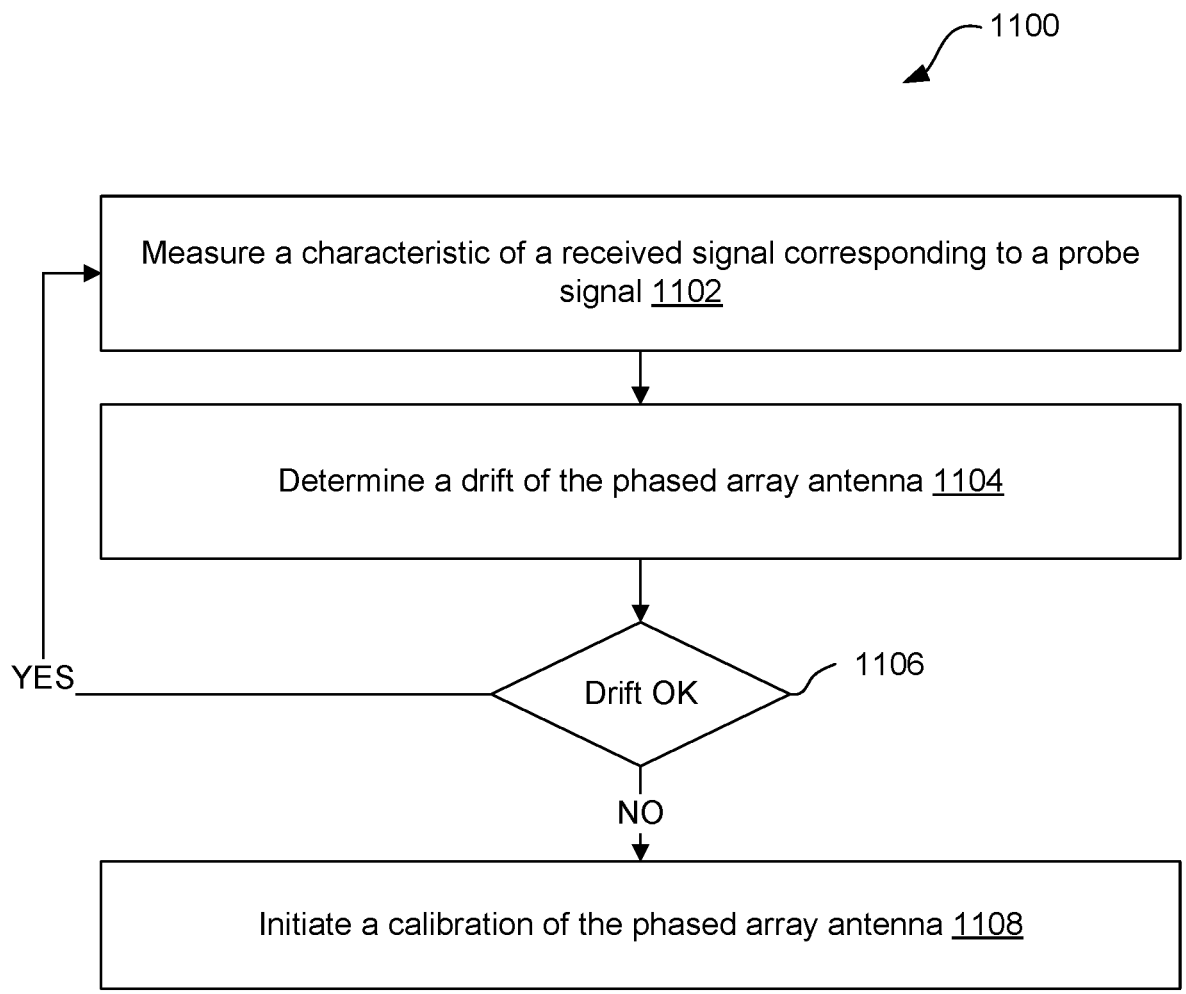
FIG. 11 illustrates an example flow for measuring drift of a phased array antenna by using a probe antenna, according to embodiments of the present disclosure.

FIG. 11 illustrates an example flow 1100 for another method of measuring drift of a phased array antenna by using a probe antenna, according to embodiments of the present disclosure. The method includes measuring a characteristic of a probe signal (1102). As described in more detail in reference to FIG. 10, the probe signal may be transmitted by the probe antenna or by an antenna element of the phased array antenna. If the phased array antenna is a receiver array, the method includes controlling the probe antenna to transmit the probe signal. If the phased array antenna is a transmitter array, the method includes transmitting probe signals by the phased array antenna elements. The method can also determining a phase and an amplitude of a received signal for each phased array antenna element. Optionally, the probe signal is multiplexed with another signal (e.g., a datalink signal to be transmitted to another communication system including, for instance, a user terminal or a ground station) of the phased array antenna, thereby avoiding or reducing interference between the probe signal and the other signal. Optionally, interference between the probe signal and the other signal is reduced by modulating the probe signal on a subcarrier that is orthogonal to one or more subcarriers of the other signal. In some embodiments, the other signal is already modulated using orthogonal frequency domain multiplexing, in which case the probe signal may be modulated on an unoccupied subcarrier to fit into the modulation scheme already being used. Optionally, the method also includes using time division multiplexing to avoid or reduce the interference. In this method, the probe signal is transmitted at one or more timeslots within a frame, whereas the other signal is transmitted at one or more other timeslots within the frame, such that the probe signal and the other signal occupy non-overlapping timeslots within the frame, and similarly within other frames. Optionally, the method includes measuring a probe signal for each phased array antenna element by multiple probe antennas. As described in more detail in reference to FIGS. 7-8, the radiation pattern of each probe antenna in a system including multiple probe antennas may make it such that each phased array antenna element is within range of more than one probe antenna. In such cases, the method may include transmitting and/or receiving the probe signal by multiple probe antennas in multiple instances, and determining a mismatch between the characteristics of the two received probe signals. In some embodiments, for example, as described in more detail in reference to FIGS. 7-8, the mismatch may result from a given phased array antenna element being located in closer proximity to one probe antenna than to another probe antenna in the phased array antenna. Such design considerations may influence the characteristics of the received probe signal, and as such the method may control for such influence by selecting which received probe signal to use for drift determination. In some embodiments, a probe antenna may be operating outside or nominal parameters, necessitating calibration. In such cases, the method may optionally include determining whether the probe antenna has failed. A failed probe antenna may be determined by controlling for the functioning of the probe antenna (e.g., by measuring a separate system of phased array antenna elements in a second phased array antenna).

The method also includes determining a drift of the phased array antenna (1104). The drift of the phased array antenna may include a measure of deviation from nominal operating conditions, as described in more detail in reference to FIG. 10. Optionally, determining the drift includes determining, from a data structure (e.g., a lookup table or the like), reference values corresponding to the measured characteristic of each received signal. Optionally, the method also includes determining an offset between the measured and reference characteristics, and determining whether the offset is outside an operational range for the phased array antenna element (1106). As described in more detail in reference to FIG. 10, above, the operational range may describe the range of phase and amplitude for each individual phased array antenna element derived from an overall nominal performance of the phased array antenna.

The method further includes initiating calibration of the phased array antenna (1108). In some embodiments, the calibration is initiated based on the drift falling outside the operational range. Optionally, initiating calibration includes determining an element-wise drift and correcting each phased array antenna element individually. Alternatively, the overall drift of the phased array antenna may be determined and an overall pattern of modulations to phase and amplitude of the entire array may be effected. For example, if a specific phased array antenna element has failed or is operating too far outside the operational range, such that it cannot be corrected, the phased array antenna may be modulated to compensate for the loss of the specific phased array antenna element. This may require calculations taking into account mutual coupling between phased array antenna elements such that correction factors may be nonlinear (e.g., not a linear phase shift to correct for the phase offset in the received probe signal).

It should be appreciated that the specific steps illustrated in FIG. 11 provide a particular method of measuring drift of a phased array antenna by a probe antenna. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications.

Figure 12:
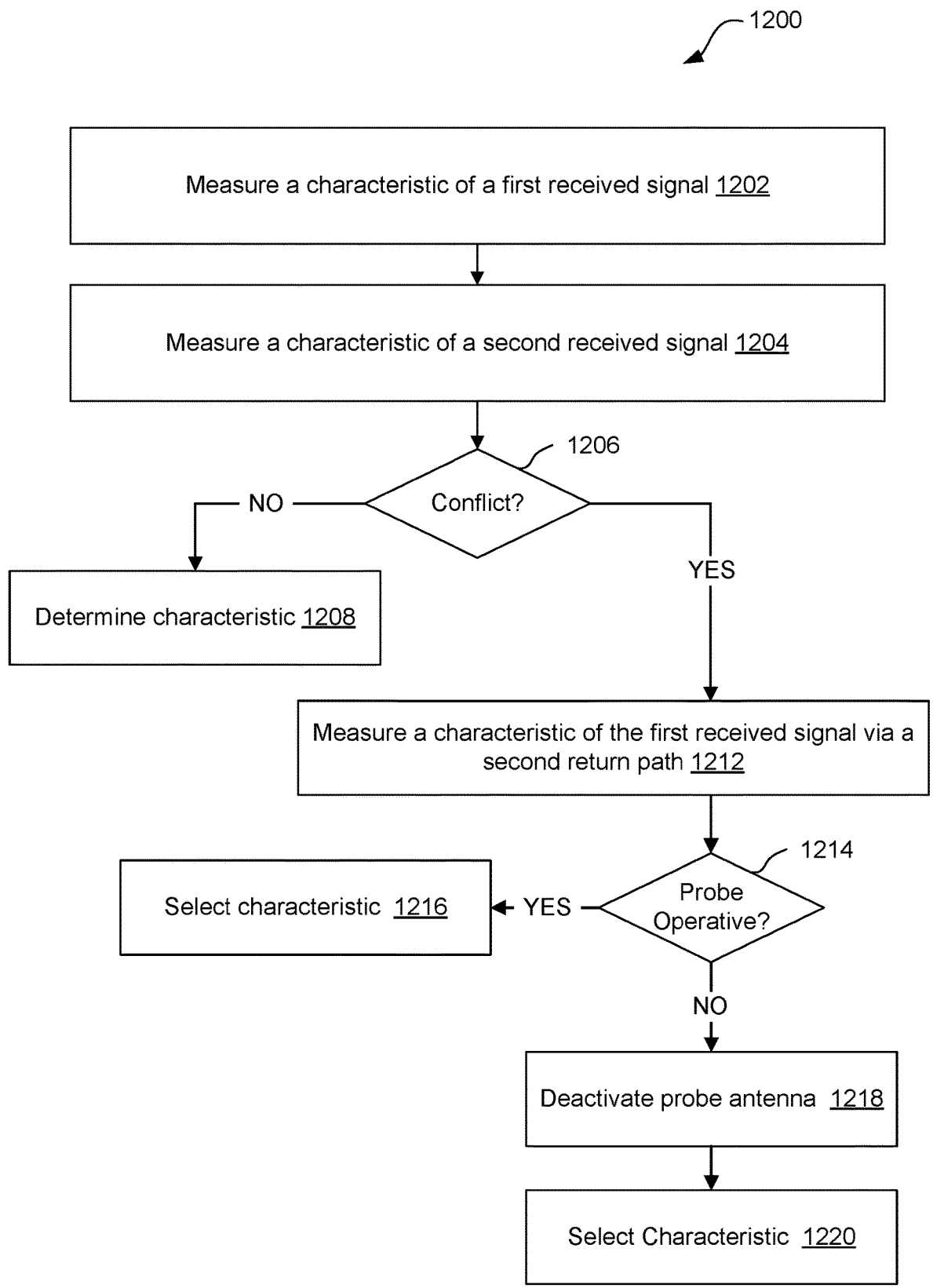
FIG. 12 illustrates an example flow for a method of improving accuracy and verifying operating properties of a probe antenna of a calibration system of a phased array antenna communications system, according to embodiments of the present disclosure.

FIG. 12 illustrates an example flow 1200 for a method of improving accuracy and verifying operating properties of a probe antenna of a calibration system, according to embodiments of the present disclosure. The method includes measuring a characteristic of a first received signal (1202) that corresponds to a first transmitted probe signal. In some embodiments, the characteristic includes a phase shift and an amplitude of a received probe signal, as described above. The first received signal is transmitted and/or received from a first probe antenna in communications with an antenna element depending on the operational mode of the first probe antenna.

The method also includes measuring a characteristic of a second received signal (1204) that corresponds to a first transmitted probe signal. The second received signal is communicated between the antenna element and a second probe antenna within range of the antenna element, as described in more detail in reference to FIGS. 8-9. The two characteristics are compared, for example, by comparing phase and amplitude parameters (e.g., after normalizing for signal strength to account for different transmission distance). The calibration system can determine whether the two characteristics are in conflict through the comparison (1206). A conflict exists when the ratio between the two characteristics exceeds a predefined threshold (e.g., a predefined error percentage, such as five percent). In cases where the two characteristics are not in conflict, the calibration system determines the characteristic by one or more techniques for combining the measurements to improve accuracy, as described in more detail in reference to FIG. 9. For example, the techniques may include, but are not limited to, weighted averaging of the two measurements, comparative smoothing and adjustment, or the like.

In cases where there is conflict between the two measurements, the method also includes measuring a characteristic of the first received signal via a second return path (1212). As an example, this includes measuring a third received signal communicated between the first probe antenna and a second antenna element. Implementing a second return path provides a secondary validation that the conflict previously determined is attributable to the first antenna element or to the first probe antenna. One or more methods may be employed to determine whether the first probe antenna is operating nominally (1214). In one example, it may be determined that the first probe antenna is inoperative if the measurements for the first return path and the second return path include a similar physically improbable or erroneous result (e.g., no signal or a noise signal). In a further example, the characteristics of a received signal of the first return path and the second return path may by measured for multiple antenna elements and multiple probe antennas. In some cases, the first probe antenna may be deemed to be inoperative when an error fraction exceeds an allowable range, where the error fraction may correspond to a fraction of characteristics measured for the first probe antenna and a set of antenna elements that conflict with corresponding characteristics from other probe antennas for the same set of antenna elements. In this way, redundant measurements may also provide information describing the operation of probe antennas making up the calibration system, as well as the accuracy of the calibration.

In cases where the probe is operating nominally, the method also includes selecting a characteristic, either of the first received signal or the second received signal (1216). As described in more detail in reference to FIG. 9, the antenna element may be located nearer to the second probe antenna than the first probe antenna, and as such the second received signal may provide a stronger and more accurate measurement of the characteristic. In some cases, the selection may also be based on a pattern of conflict making one probe signal more suitable than another. For example, the characteristic measured from the second received signal may be selected when the first probe antenna is found to provide data that conflicts to a sufficiently high degree with data provided by other probe antennas measuring characteristics of the same antenna elements (i.e., even when the first probe antenna is nearer to the antenna element in question). In cases where a probe error is indicated (e.g., the received signal as measured via both the first return path and the second return path indicates similar or identical errors) the method includes deactivating the probe antenna (1218), and selecting the characteristic of the second received signal (1220).

It should be appreciated that the specific steps illustrated in FIG. 12 provide a particular method of improving accuracy and verifying operating properties of a probe antenna. Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications.

Figure 13:
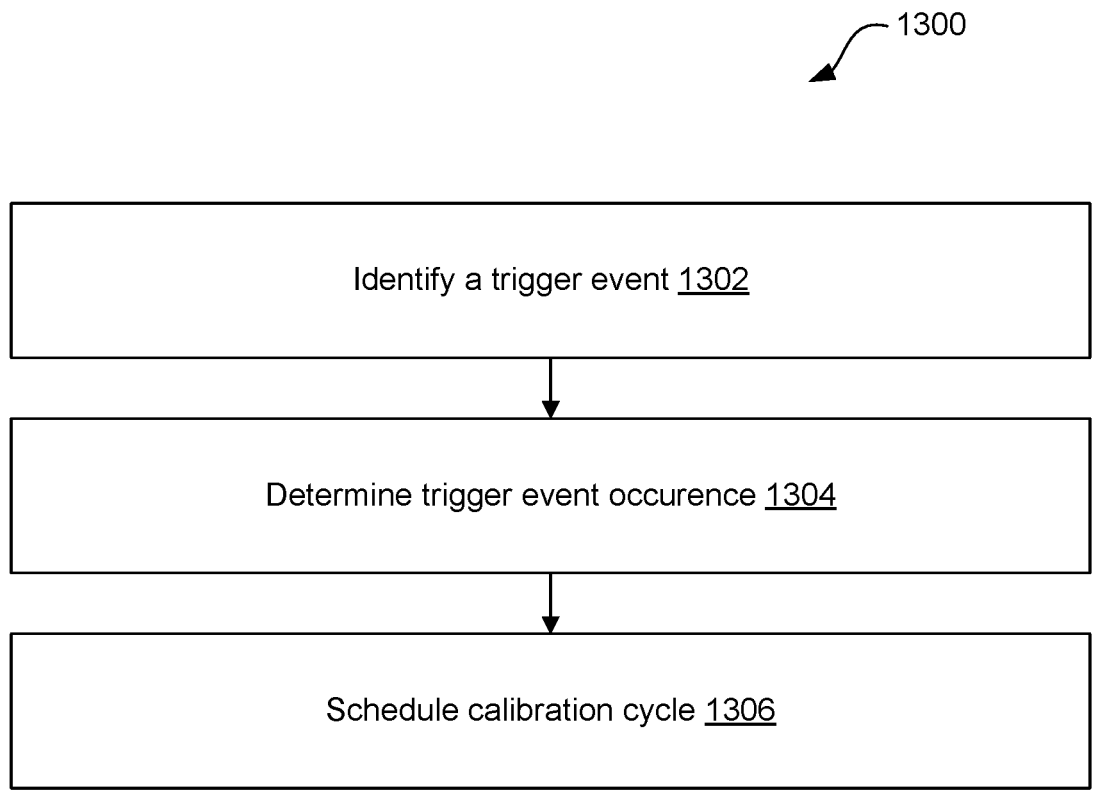
FIG. 13 illustrates an example flow for a method of initiating and scheduling a calibration cycle by a calibration system of a phased array antenna communications system, according to embodiments of the present disclosure.

FIG. 13 illustrates an example flow 1300 for a method of initiating and scheduling a calibration cycle by a calibration system of a phased array antenna communications system, according to embodiments of the present disclosure. According to certain embodiments, the method includes one or more trigger events that are identified as indicating a potential de-calibration (1302). For example, a trigger event may be a time entry in a re-calibration schedule stored in memory of the calibration system (e.g., data store 160 of FIG. 1). As another example, a trigger event may include a frame error rate above an allowable limit, as measured by data transfer performance of the communications system being monitored by the calibration system. As described in more detail in reference to FIGS. 3-4, degradation of phased array antenna performance impacts data transfer rate, thus allowing a calibration error to be inferred from poor performance. As another example, a trigger event may include a measurement of the radiation pattern of the phased array antenna by one or more methods. In some cases, interference caused by sidelobe emission is measured by a sensor included in the phased array antenna, either as a separate antenna or as part of signal processing hardware. Calibration errors in the output amplitudes from phased array antenna elements may be inferred from a shift in sidelobe levels. In some cases, a beam measurement is used to determine calibration error of the radiation pattern, for example, by providing a calibration target (e.g. a beam shape characterization system) as part of the communications network (e.g., a specialized ground station designed to measure beam characteristics of orbiting communications satellites).

The method also includes a determination that a trigger event has occurred (1304). calibration. For the example of a pre-scheduled calibration cycle, determining the trigger event is a simple time stamp in a schedule. For beam shape characterization, the triggering event is the communications system creating a communications link with the calibration target and receiving beam characterization data (e.g., when the calibration target enters range of an orbiting communications satellite, as described in more detail in reference to FIG. 3).

The method also includes scheduling the calibration cycle (1306). As described above, the trigger event's occurrence triggers the calibration system to schedule operations related to determining antenna drift and, as needed, initiating a calibration. As such, one or more multiplexing techniques, as described in more detail in reference to FIG. 5, are used. In addition, as described in more detail in reference to FIG. 3, a calibration cycle, which includes the steps outlined in reference to FIGS. 10-11, may be scheduled for a future time during which the communications system will be operating below peak bandwidth or when low data traffic is to be communicated.

It should be appreciated that the specific steps illustrated in FIG. 13 provide a particular method of initiating and scheduling a calibration cycle. Other sequences of steps may also be performed according to alternative embodiments. For example, alternative embodiments of the present invention may perform the steps outlined above in a different order. Moreover, the individual steps illustrated in FIG. 13 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 14:
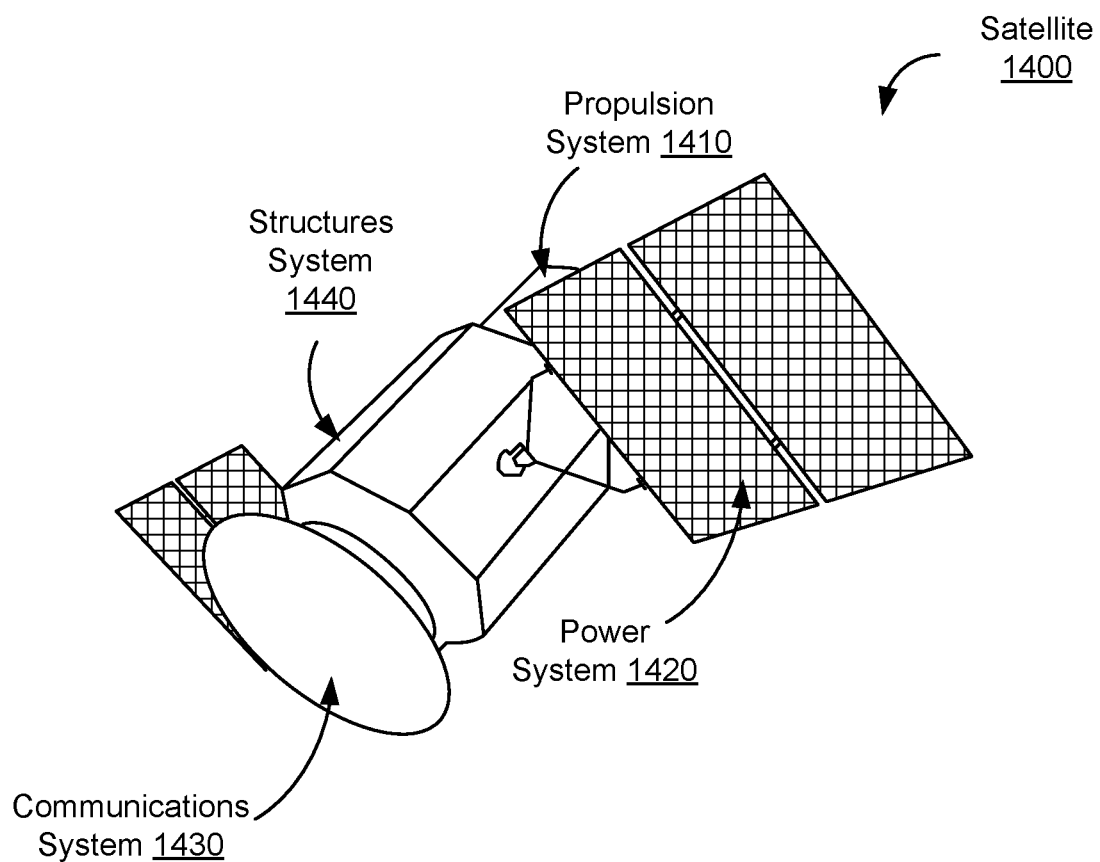
FIG. 14 illustrates an example of components of a satellite, according to embodiments of the present disclosure.

FIG. 14 illustrates an example of components of a satellite 1400, according to embodiments of the present disclosure. The satellite 1400 is an example of any of the satellites 202 and 204 of FIG. 2 and can include a calibration system, as described herein above. As illustrated, the satellite 1400 includes, among other components, a propulsion system 1410, a power system 1420, a communications system 1430, and a structures system 1440.

In an example, the propulsion system 1410 includes one or more motors (e.g., rocket motors) that may move the satellite 1400 in a position within an orbit. The propulsion system 1410 also includes as thrusters to maintain the satellite 1400 in its position. The thrusters can also be used to move the satellite 1400 back into position in the orbit due to, for instance, solar wind or gravitational or magnetic forces.

In an example, the power system 1420 generates electricity from the solar panels deployed on the outside of the satellite 1400. The solar panels also store electricity in a set of storage batteries installed within the structures system 1440. The set of storage batteries can provide power at times when the panels do not receive rays from the sun. The power is used to operate various systems of the satellite 1400, including the communications system 1430.

In an example, the communications system 1430 handles receive and transmit functions. The communications system 1430 receives signals from a source, amplifies them, and transmits them to a destination. The source can be user equipment on the Earth or another satellite. The destination is typically different from the source and includes user equipment on the Earth or another satellite.

In an example, the structures system 1440 provides a stable set of structures so that the satellite 1400 can be kept in position. The structures system 1440 can also house components of other systems, such as subsystems of the power system 1420 (e.g., the storage batteries, power converters, and the like) and subsystems of the communications system 1430 (e.g., receivers, transmitters, and the like). Other components can also be housed within the structures system 1440. For instance, a thermal control system is contained in the structures system 1440. The thermal control system keeps components of the satellite 1400 within their operational temperature ranges. A control system is also contained in the structures system 1440. The control system orients the satellite 1400 precisely to maintain the proper position. When the satellite gets out of position, the control system instructs the propulsion system 1410 to control one or more thrusters to move the satellite 1400 back in position. The control system also includes tracking, telemetry, and control subsystems for monitoring vital operating parameters of the satellite 1400, telemetry circuits for relaying this information to user equipment on the Earth, a system for receiving and interpreting commands sent to the satellite 1400 from the user equipment or another satellite, and a command system for controlling the operation of the satellite 1400.

Figure 15:
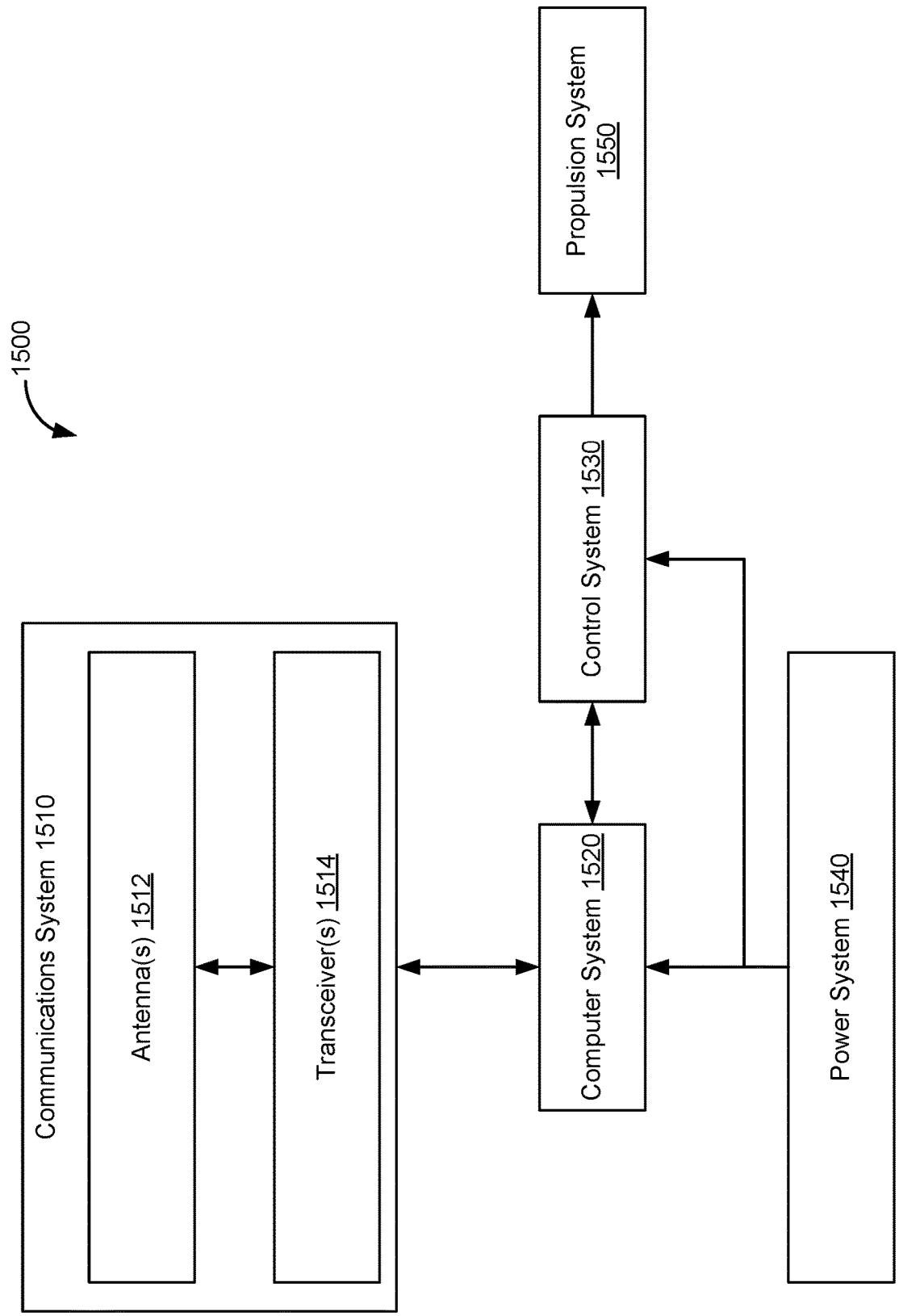
FIG. 15 illustrates an example of components of a computer system that can belong to a satellite, according to embodiments of the present disclosure.

FIG. 15 illustrates an example of components of systems 1500 of a satellite, according to embodiments of the present disclosure. The satellite can be any of the satellites described herein above. As illustrated, the systems 1500 include a communications system 1510, a computer system 1520, a control system 1530, a power system 1540, and a propulsion system 1550.

In an example, the communications system 1510 provides communications with other satellites and/or user equipment such as ground stations. In addition to including a calibration system, the communications system 1510 can include a set of antennas 1512 and a set of transceivers 1514. The set of antennas 1512 supports radio frequencies within a desired frequency spectrum and can be a phased area of antenna elements. The transceivers 1514 can be components of a transponder of the satellite and can include a set of satellite receivers and a set of satellite transmitters. The satellite transmitter(s) may, for example, multiplex, encode, and compress data to be transmitted, then modulate the data to a desired radio frequency and amplify it for transmission over the set of antennas 1512. Multiple channels can be used, in addition to error correction coding. The satellite receiver(s) demodulates received signals and performs any necessary de-multiplexing, decoding, decompressing, error correction and formatting of the signals from set of antennas 1512, for use by the computer system 1520. The set of antennas 1512 and/or the set of transceivers 1514 may also include switches, filters, low-noise amplifiers, down converters (for example, to an intermediate frequency and/or baseband), and/or other communications components. Data decoded by the satellite receiver(s) can be output to the computer system 1520 for further processing. Conversely, an output of the computer system 1520 can be provided to the satellite transmitter(s) for transmission.

The computer system 1520 can be communicatively coupled with the communications system 1510, the control system 1530, and the power system 1540. In an example, the computer system 1520 provides controls over and/or receives and processes data of the communications system 1510, the control system 1530, and the power system 1540. For instance, the computer system can process communications data of the communications system 1510, outputs attitude and position information to the control system 1530, and outputs power distribution controls to the power system 1540.

In an example, the control system 1530 maintains the satellite in a proper position within an orbit by instructing the propulsion system 1550 to control thrusters and/orient the satellite precisely to maintain the proper position. Maintaining the orbit may also include maintaining the desired nodal separations between itself and the other satellites within the satellite constellation. For instance, the control system 1530 includes tracking, telemetry, and processors for calculating and/or receiving attitude and/or orbit adjustment information.

The power system 1540 provides electrical power to other ones of the systems 1500 including the communications system 1510, the computer system 1520, the control system 1530, and the propulsion system 1550. The power system 1540 may, for example, include one or more solar panels and a supporting structure, and one or more batteries. Telemetry circuits and processors of the power system 1540 can monitor the power collection and the power consumption and can control the collection and the distribution of the electrical power to the other ones of the systems 1500.

The propulsion system 1550 may include a set of motors and set of thrusters. The propulsion system 1550 may also include a set of fuel sources, such as fuel and oxidant tanks, battery cells, liquid fuel rocket, and/or an ion-thruster system. Telemetry circuits and processors of the propulsion system 1550 can control operations of the motors, thrusters, and/or fuel sources to move and/orient the satellite.

In an example, the computer system 1520 (and, similarly, the remaining ones of the systems 1500) includes at least a processor, a memory, a storage device, communications peripherals, and an interface bus. The interface bus is configured to communicate, transmit, and transfer data, controls, and commands among the various components of the computer system 1520. The memory and the storage device include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory and the storage device also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computer system 1520.

Further, the memory includes an operating system, programs, and applications. The processor is configured to execute the stored instructions and includes, for example, a logical processing unit, a microprocessor, a digital signal processor, and other processors. The communications peripherals are configured to facilitate communications between the computer system 1520 and remaining ones of the systems 1500 and include, for example, a communications bus and/or a network interface controller, modem, wireless and wired interface cards, antenna, and other communications peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the portable device from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A satellite communications system comprising:
an antenna system comprising:
a phased array antenna comprising a plurality of antenna elements including a first antenna element and a second antenna element; and
a probe antenna that is over-resonant and having a length equal to a multiple of a value in a length range between 0.25λ and 0.45λ, wherein "λ" is a wavelength of a probe signal transmitted by the probe antenna, wherein the first antenna element is located at a first distance from the probe antenna and the second antenna element is located at a second distance from the probe antenna; and
a computer system in communication with the antenna system, the computer system comprising a memory storing computer executable instructions that, when executed, cause the computer system to:
cause a transmission of the probe signal by the probe antenna to the plurality of antenna elements;
measure a first characteristic of a first signal that is received by the first antenna element, the first signal corresponding to the probe signal, wherein the first characteristic comprises at least one of a phase or an amplitude of the first signal;
measure a second characteristic of a second signal that is received by the second antenna element, the second signal corresponding to the probe signal, wherein the second characteristic comprises at least one of a phase or an amplitude of the second signal, and wherein the second characteristic is within a threshold range of the first characteristic;
determine a drift associated with the first antenna element by at least determining a difference between the first characteristic and a reference characteristic, the reference characteristic comprising a nominal phase or a nominal amplitude and associated with the first antenna element; and
determine that the drift is outside a range of allowable drift for the first antenna element; and
initiate calibration of the phased array antenna.

2. The satellite communications system of claim 1, wherein the memory stores further computer executable instructions that, when executed, cause the computer system to additionally:
cause a second transmission, to the probe antenna, of a second probe signal by a third antenna element of the phased array antenna;
measure a third characteristic of a third signal that is received by the probe antenna in response to the second transmission;
access, from the memory, a second reference characteristic defined for the third antenna element and comprising at least one of: a second nominal amplitude or a second nominal phase; and
determine a second drift of the third antenna element by at least comparing the third characteristic to the second reference characteristic.

3. The satellite communications system of claim 1, wherein the memory stores further computer executable instructions that, when executed, cause the computer system to additionally:
control a timing of the transmission of the probe signal, wherein the timing corresponds to a time period during which the phased array antenna is not receiving signals from another communications system.

4. A system comprising:
a phased array antenna comprising a plurality of antenna elements;
a probe antenna that is over-resonant and that is mounted to the phased array antenna, wherein at least two antenna elements of the plurality of antenna elements are at different distances from the probe antenna; and
a controller coupled with the phased array antenna and the probe antenna, the controller configured to:
measure, for each antenna element of the at least two antenna elements, a characteristic of a signal that is communicated between the antenna element and the probe antenna, the characteristic corresponding to (i) the signal being received by the antenna element in response to a transmission of a probe signal by the probe antenna or (ii) the signal being received by the probe antenna in response to a transmission by the antenna element;
determine, for each antenna element of the at least two antenna elements, a difference between a corresponding characteristic measured for the antenna element and a reference characteristic associated with the antenna element;
determine, based at least in part on the difference, an offset associated with the at least two antenna elements; and
initiate, based at least in part on the offset, a calibration of the phased array antenna.

5. The system of claim 4, wherein the controller is further configured to:
if the phased array antenna is a receiver array, cause the probe antenna to transmit the probe signal to the plurality of antenna elements;
if the phased array antenna is a transmitter array, cause each of the plurality of antenna elements to transmit a different probe to the probe antenna;
determine, for a first antenna element of the plurality of antenna elements, a first difference between a first characteristic measured for the first antenna element and a first reference characteristic defined for the first antenna element; and
determine a drift of the first antenna element based at least in part on the first difference, wherein the calibration is initiated further based at least in part on the drift.

6. The system of claim 5, wherein the controller is configured to determine the drift by at least:
determining, from a data structure, the first reference characteristic that comprises at least one of: a reference amplitude or a reference phase, wherein the first reference characteristic is different from a second reference characteristic defined for a second antenna element; and
determining that the first difference is outside an operational range of the first antenna element.

7. The system of claim 4, wherein the probe antenna has a length of a multiple of a value in a range between 0.25λ and 0.45λ, wherein "λ" is a wavelength of the probe signal transmitted by the probe antenna.

8. The system of claim 4, wherein the controller is further configured to:
control the transmission of the probe signal by the probe antenna and a second transmission of a different signal that is communicated by the phased array antenna with another communication system, wherein the transmission and the second transmission are controlled by at least avoiding a collision between the probe signal and the different signal.

9. The system of claim 8, wherein the controller is configured to control the transmission and the second transmission by at least modulating the probe signal on a first subcarrier as a first subcarrier signal and modulating the different signal on a second subcarrier as a second subcarrier signal, and wherein the first subcarrier signal and the second subcarrier signal are orthogonal to each other.

10. The system of claim 8, wherein the controller is configured to control the transmission and the second transmission by at least transmitting the probe signal at a first timeslot within a frame that is divided into timeslots and transmitting the different signal at a second timeslot within the frame, and wherein the first timeslot and the second timeslot are non-overlapping.

11. The system of claim 4, further comprising:
a second phased array antenna attached with the phased array antenna; and
a second probe antenna mounted to the second phased array antenna, wherein the controller is further configured to:
measure a second characteristic of a second signal, wherein the second signal is communicated between the phased array antenna and the second probe antenna.

12. The system of claim 4, further comprising:
a second phased array antenna attached with the phased array antenna; and
a second probe antenna mounted to the second phased array antenna, wherein the controller is further configured to:
measure a first characteristic of a first signal, wherein the first signal is communicated between a first antenna element of the phased array antenna and the probe antenna;
measure a second characteristic of a second signal, wherein the second signal is communicated between the first antenna element and the second probe antenna;
determine a mismatch between the first characteristic and the second characteristic; and
determine that a ratio of the first characteristic and the second characteristic exceeds a predefined error percentage; wherein the calibration is initiated based at least in part on the first characteristic and not the second characteristic.

13. The system of claim 12, wherein the controller is further configured to:
determine a first pattern of drift of the plurality of antenna elements based at least in part on the probe signal transmitted by the probe antenna, determine a second pattern of drift of the plurality of antenna elements based at least in part on a probe signal transmitted by the second probe antenna, and select, based at least in part on the first pattern and the second pattern, the first characteristic to calibrate the first antenna element; or
determine that a first distance between the first antenna element and the probe antenna is shorter than a second distance between the first antenna element and the second probe antenna, and select, based at least in part on the first distance being shorter, the first characteristic to calibrate the first antenna element.

14. The system of claim 4, further comprising:
a second phased array antenna attached with the phased array antenna; and
a second probe antenna mounted to the second phased array antenna, wherein the controller is further configured to:
measure a first characteristic of a first signal, wherein the first signal is communicated between the phased array antenna and the second probe antenna;
measure a second characteristic of a second signal, wherein the second signal is communicated between the second probe antenna and the second phased array antenna;
determine a mismatch between the first characteristic and the second characteristic; and
determine a failure of the second probe antenna based at least in part on the mismatch.

15. An antenna system comprising:
a phased array antenna;
a probe antenna that is over-resonant, mounted to the phased array antenna, and having a first mode and a second mode, wherein in the first mode the probe antenna is deactivated while the phased array antenna is activated, and wherein in the second mode the probe antenna and the phased array antenna are both activated, wherein a first antenna element of the phased array antenna is at a first distance from the probe antenna, and wherein a second antenna element of the phased array antenna is at a second distance from the probe antenna; and
a controller coupled with the phased array antenna and the probe antenna, the controller configured to:
measure, for the first antenna element, a first characteristic of a first signal that is communicated between the first antenna element and the probe antenna;
measure, for the second antenna element, a second characteristic of a second signal that is communicated between the second antenna element and the probe antenna; and
initiate a calibration of the phased array antenna based at least in part on the first characteristic and the second characteristic.

16. The antenna system of claim 15, wherein the probe antenna has a length of a multiple of a value in a range between 0.25λ and 0.45λ, wherein "λ" is a wavelength of a probe signal transmitted by the probe antenna.

17. The antenna system of claim 16, wherein the probe antenna is electrically coupled with a matching impedance in a range of 50 ohms to 100 ohms, and wherein the matching impedance is based at least in part on the length of the probe antenna.

18. The antenna system of claim 15, wherein the probe antenna is an omnidirectional monopole antenna, a patch antenna, or a helix antenna.

19. The antenna system of claim 15, wherein the controller is further configured to:
determine a difference between the first characteristic and a first reference characteristic associated with the first antenna element; and
determine that the difference is outside an operational range of the first antenna element, wherein the calibration is initiated based at least in part on the difference.

20. The antenna system of claim 15, further comprising:
a plurality of phased array antennas; and a plurality of probe antennas mounted to at least a subset of the plurality of phased array antennas and oriented relative to the plurality of phased array antennas in an orientation where each of the phased array antennas is within transmission range of at least one probe antenna of the plurality of probe antennas.

* * * * *